(12) United States Patent
Kurian

(10) Patent No.: US 11,329,823 B2
(45) Date of Patent: *May 10, 2022

(54) USER AUTHENTICATION USING TOKENS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/584,416

(22) Filed: Sep. 26, 2019

(65) Prior Publication Data

US 2021/0099300 A1    Apr. 1, 2021

(51) Int. Cl.
  *H04L 9/32* (2006.01)
  *H04L 29/06* (2006.01)
  *H04W 12/08* (2021.01)

(52) U.S. Cl.
  CPC .......... *H04L 9/3213* (2013.01); *H04L 9/3234* (2013.01); *H04L 9/3268* (2013.01); *H04L 63/08* (2013.01); *H04W 12/08* (2013.01)

(58) Field of Classification Search
  None
  See application file for complete search history.

(56) References Cited

U.S. PATENT DOCUMENTS

| | | |
|---|---|---|
| 5,719,950 A | 2/1998 | Osten et al. |
| 6,345,761 B1 | 2/2002 | Seelbach et al. |
| 6,516,368 B1 | 2/2003 | Arimilli et al. |
| 6,836,556 B1 | 12/2004 | Bromba et al. |
| 7,165,716 B1 | 1/2007 | Modl et al. |
| 7,260,555 B2 | 8/2007 | Rossmann et al. |
| 8,769,627 B1 | 7/2014 | Guo et al. |
| 9,141,779 B2 | 9/2015 | Shen et al. |
| 9,558,415 B2 | 1/2017 | Paul et al. |
| 9,697,517 B1 | 7/2017 | Chambers et al. |
| 9,848,052 B2 | 12/2017 | Kumnick |
| 10,263,787 B1 | 4/2019 | Gelman et al. |
| 10,462,140 B2 | 10/2019 | Kurian et al. |
| 10,701,054 B2 | 6/2020 | Padmanabhan et al. |
| 10,749,678 B1 | 8/2020 | Kurian |
| 10,764,270 B2 | 9/2020 | Hayes et al. |
| 10,862,880 B1 | 12/2020 | Massicotte |
| 10,904,230 B2 | 1/2021 | Aluvala et al. |
| 10,911,429 B2 | 2/2021 | Law et al. |
| 11,122,133 B2 | 9/2021 | Kumnick |

(Continued)

FOREIGN PATENT DOCUMENTS

EP    1766852 A1    3/2007

*Primary Examiner* — Brandon Hoffman
(74) *Attorney, Agent, or Firm* — Banner & Witcoff, Ltd.

(57) ABSTRACT

Aspects of the disclosure relate to token-based authentication mechanism. A computing device may receive information, determined by one or more sensors systems, corresponding to a user. The user information may comprise user biological information as measured by the one or more sensor systems. The computing device may generate a token based on the received user information. The computing device may store the generated token, in a memory associated with the computing device. The computing device may transmit the token to a user token device corresponding to the user. The user token device may be used to authenticate the user.

18 Claims, 13 Drawing Sheets

(56) References Cited

U.S. PATENT DOCUMENTS

| | | |
|---|---|---|
| 11,140,154 B2 | 10/2021 | Kurian |
| 2003/0110131 A1 | 6/2003 | Alain et al. |
| 2006/0015358 A1 | 1/2006 | Chua |
| 2007/0092114 A1 | 4/2007 | Ritter et al. |
| 2007/0150744 A1 | 6/2007 | Cheng et al. |
| 2007/0229874 A1* | 10/2007 | Hamada .............. G06F 3/1238 358/1.14 |
| 2008/0015115 A1 | 1/2008 | Guyot-Sionnest et al. |
| 2008/0065892 A1* | 3/2008 | Bailey .............. H04L 9/0897 713/171 |
| 2008/0270791 A1 | 10/2008 | Nystrom et al. |
| 2009/0294523 A1 | 12/2009 | Marano et al. |
| 2009/0315859 A1 | 12/2009 | Chien et al. |
| 2010/0251352 A1 | 9/2010 | Zarchy et al. |
| 2011/0167483 A1 | 7/2011 | Lee et al. |
| 2011/0231940 A1 | 9/2011 | Perumal et al. |
| 2012/0054491 A1 | 3/2012 | Tippett |
| 2013/0042307 A1 | 2/2013 | Imamura |
| 2013/0145450 A1 | 6/2013 | Gamble et al. |
| 2013/0252583 A1 | 9/2013 | Brown et al. |
| 2014/0122890 A1 | 5/2014 | Prot |
| 2014/0258433 A1 | 9/2014 | Clark |
| 2014/0337206 A1 | 11/2014 | Talker |
| 2015/0031915 A1 | 1/2015 | Chaplin et al. |
| 2015/0036503 A1 | 2/2015 | Kaplan et al. |
| 2015/0096056 A1 | 4/2015 | Mattsson et al. |
| 2015/0101059 A1 | 4/2015 | Galpin |
| 2015/0188779 A1 | 7/2015 | McCanne et al. |
| 2015/0206139 A1 | 7/2015 | Lea |
| 2015/0222435 A1 | 8/2015 | Lea |
| 2015/0338953 A1 | 11/2015 | Liu et al. |
| 2016/0119296 A1 | 4/2016 | Laxminarayanan et al. |
| 2016/0191503 A1 | 6/2016 | Panchapakesan et al. |
| 2016/0191526 A1 | 6/2016 | Panchapakesan |
| 2016/0261581 A1 | 9/2016 | Wang et al. |
| 2016/0261588 A1 | 9/2016 | Shenker et al. |
| 2016/0308851 A1 | 10/2016 | Tiwari |
| 2017/0016362 A1 | 1/2017 | Choi et al. |
| 2017/0177105 A1 | 6/2017 | Wu et al. |
| 2017/0195121 A1 | 7/2017 | Frei et al. |
| 2017/0195879 A1 | 7/2017 | Jones-McFadden |
| 2017/0250993 A1 | 8/2017 | Reid et al. |
| 2017/0302656 A1 | 10/2017 | Ramatchandirane |
| 2017/0324686 A1 | 11/2017 | Sheth et al. |
| 2017/0324749 A1 | 11/2017 | Bhargava et al. |
| 2018/0048735 A1 | 2/2018 | Drouin et al. |
| 2018/0077122 A1 | 3/2018 | Hoss et al. |
| 2018/0077142 A1 | 3/2018 | Thakkar |
| 2018/0108008 A1 | 4/2018 | Chumbley |
| 2018/0114220 A1* | 4/2018 | Ekberg .............. H04L 9/007 |
| 2018/0124188 A1 | 5/2018 | Olds et al. |
| 2018/0198617 A1 | 7/2018 | Drouin et al. |
| 2018/0212956 A1 | 7/2018 | Sanganabhatla |
| 2018/0227290 A1 | 8/2018 | Yang |
| 2018/0239976 A1 | 8/2018 | Cornelius et al. |
| 2018/0276657 A1 | 9/2018 | Cho et al. |
| 2018/0302382 A1 | 10/2018 | Lehmann et al. |
| 2018/0309693 A1 | 10/2018 | Kimura et al. |
| 2018/0316494 A1 | 11/2018 | Kurian et al. |
| 2018/0337784 A1 | 11/2018 | Jain et al. |
| 2018/0341937 A1 | 11/2018 | Kim et al. |
| 2018/0351958 A1 | 12/2018 | Sakurai |
| 2019/0005342 A1 | 1/2019 | Rosqvist |
| 2019/0020478 A1 | 1/2019 | Girish et al. |
| 2019/0044714 A1 | 2/2019 | Parker et al. |
| 2019/0124056 A1 | 4/2019 | Monibi et al. |
| 2019/0147439 A1 | 5/2019 | Wang et al. |
| 2019/0158288 A1 | 5/2019 | Williamson et al. |
| 2019/0158487 A1* | 5/2019 | Hayes .............. H04W 12/06 |
| 2019/0166107 A1 | 5/2019 | Aluvala et al. |
| 2019/0200218 A1 | 6/2019 | Berg |
| 2019/0238525 A1 | 8/2019 | Padmanabhan et al. |
| 2019/0268159 A1 | 8/2019 | High et al. |
| 2019/0279198 A1 | 9/2019 | Laracey |
| 2019/0297147 A1 | 9/2019 | Drasin et al. |
| 2019/0303944 A1 | 10/2019 | Borucki |
| 2019/0311357 A1 | 10/2019 | Madisetti et al. |
| 2019/0312730 A1 | 10/2019 | Engan et al. |
| 2019/0356661 A1 | 11/2019 | Hecht |
| 2019/0363886 A1 | 11/2019 | Atwood et al. |
| 2019/0372767 A1 | 12/2019 | Mahajan et al. |
| 2019/0378142 A1 | 12/2019 | Darnell et al. |
| 2019/0385160 A1 | 12/2019 | Safak et al. |
| 2020/0007316 A1 | 1/2020 | Krishnamacharya et al. |
| 2020/0036514 A1 | 1/2020 | Christensen et al. |
| 2020/0036531 A1 | 1/2020 | Minovic et al. |
| 2020/0045140 A1 | 2/2020 | Khemani et al. |
| 2020/0053081 A1 | 2/2020 | Park et al. |
| 2020/0076797 A1 | 3/2020 | Mihara |
| 2020/0099675 A1 | 3/2020 | Mardiks Rappaport et al. |
| 2020/0112436 A1 | 4/2020 | Kanukollu |
| 2020/0127858 A1 | 4/2020 | Stohr et al. |
| 2020/0136809 A1 | 4/2020 | Newman et al. |
| 2020/0145403 A1 | 5/2020 | Chang et al. |
| 2020/0244643 A1 | 7/2020 | Sugimura |
| 2020/0259652 A1 | 8/2020 | Schmaltz, III et al. |
| 2020/0274712 A1 | 8/2020 | Gray et al. |
| 2020/0351263 A1 | 11/2020 | Tiruvaipeta et al. |
| 2021/0008457 A1 | 1/2021 | Schouviller et al. |
| 2021/0097530 A1 | 4/2021 | Chang |
| 2021/0099300 A1 | 4/2021 | Kurian |
| 2021/0099437 A1 | 4/2021 | Kurian |
| 2021/0105264 A1 | 4/2021 | Patel et al. |
| 2021/0126794 A1 | 4/2021 | Forrester et al. |
| 2021/0135873 A1 | 5/2021 | Atiya et al. |

\* cited by examiner

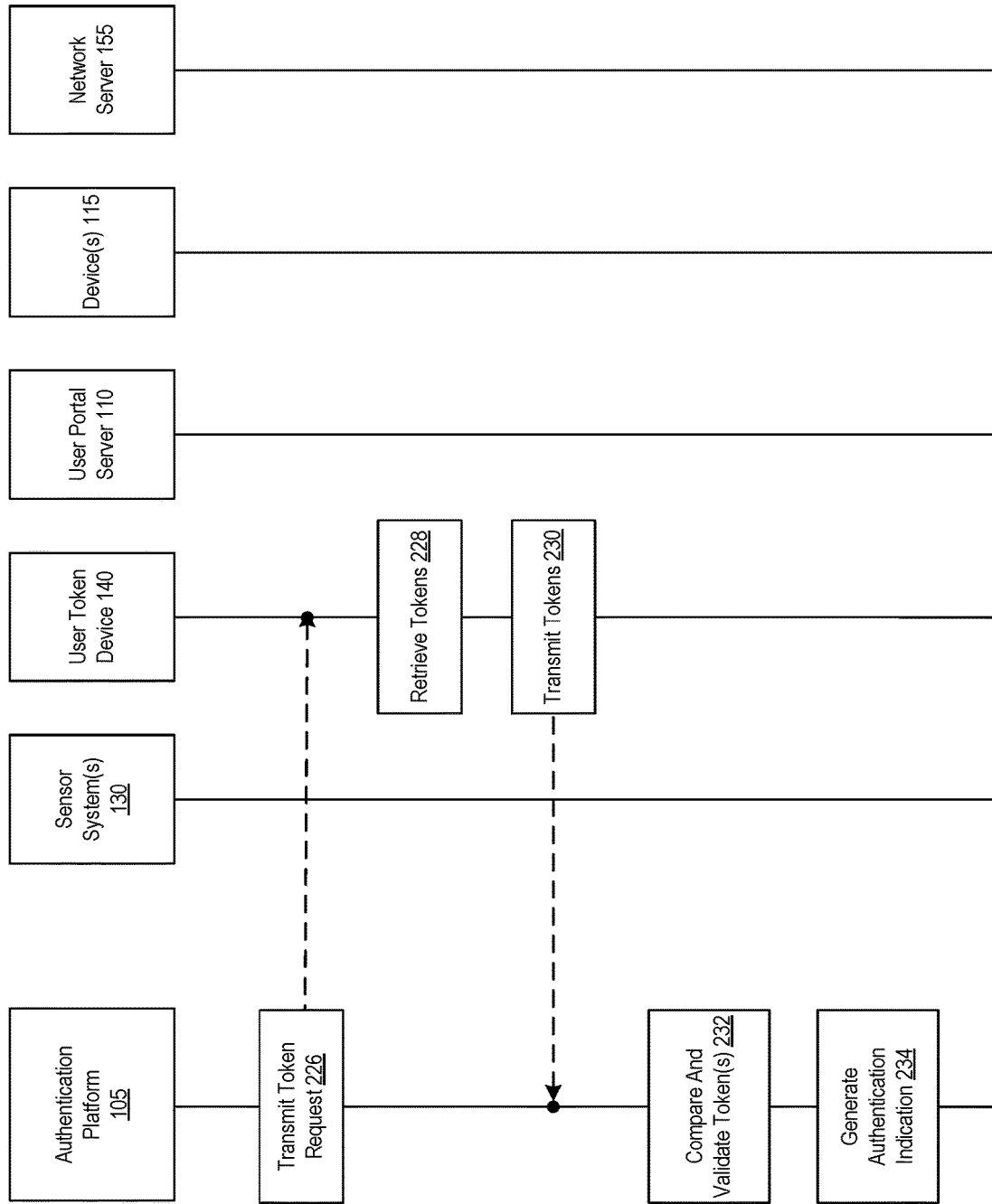

FIG. 3A
300

| | 302-1 | 302-2 | 302-3 | 302-4 | | 302-n | |
|---|---|---|---|---|---|---|---|
| Header(H) | H1 | H2 | H3 | H4 | ... | Hn | |
| Body(Y) | Y1 | Y2 | Y3 | Y4 | ... | Yn | |
| Assignee: | $A_1$ | $B_1$ | $A_1$ | $C_1$ | | | |

FIG. 3B
350

| | 302-1 | 302-2 | 350-1 | 350-2 | 302-3 | 302-4 | | 302-m |
|---|---|---|---|---|---|---|---|---|
| Header(H) | H1 | H2 | H5 | H6 | H3 | H4 | ... | Hm |
| Body(Y) | Y1 | Y2 | Y5 | Y6 | Y3 | Y4 | ... | Ym |
| Assignee: | $A_1$ | $B_1$ | $A_2$ | $B_2$ | $A_1$ | $C_1$ | | |

USER AUTHENTICATION USING TOKENS

FIELD

Aspects described herein generally relate to computer systems, networks, and user access thereto. More specifically, aspects of this disclosure relate to token-based authentication and access control systems for enhancing computer and data security.

BACKGROUND

Increased use of networked systems and resources via which users may access systems, and/or view/modify information may lead to increased vulnerabilities to unauthorized access. It may be difficult to ensure safety and ability to provide customizable security solutions while also optimizing the efficient and flexible technical operations of various resources. Token-based authentication mechanisms are generally used as a layer of security in computing systems. Tokens may be used in addition to, for example, a user password, as an extra layer of authentication to access a resource.

SUMMARY

Aspects of the disclosure provide flexible and customizable solutions that address and overcome technical problems associated with providing information security and access control to various systems. In particular, one or more aspects of the disclosure relate to using user data for generation of user-specific tokens for authentication and access control.

In accordance with one or more arrangements, a computing platform having at least one processor, a communication interface, and memory may receive, via the communication interface, user information corresponding to a user. The user information may correspond to information determined using one or more sensor systems. The computing platform may generate, based on the received user information, a first token corresponding to the user. Generating the first token may comprise assigning the token to an assignee. The computing platform may store, in the memory, the first token. The computing platform may store the first token in a token chain corresponding to the user. The computing platform may transmit, via the communication interface and to a user token device corresponding to the user, the first token.

In some arrangements, the computing platform may receive, via the communication interface and from a source, a user validation request. The user validation request may comprise an indication of the source. The computing platform may generate a token request, where the token request may comprise an indication of the source. The computing platform may transmit, via the communication interface and to the user token device, the token request.

In some arrangements, the token request may comprise an indication of a number of tokens requested from the user token device. The computing platform may receive, from the user token device and based on the token request, a message indicating that the user token device does not have a number of tokens, assigned to the source, that is equal to the number of tokens requested from the user token device.

In some arrangements, the computing platform may generate, an authentication message. The authentication message may indicate that the user validation request is an invalid request. The computing platform may transmit, to the source, the authentication message.

In some arrangements, the computing platform may generate, a new token request, where the new token request comprises an indication of one or more mathematical operations that may be used to generate new tokens. The computing platform may transmit, to the user token device, the new token request. The computing platform may receive, from the user token device, one or more second tokens, where the one or more second tokens comprise at least tokens generated based on the new token request.

In some arrangements, the computing platform may receive, from the user token device, one or more second tokens, where the one or more second tokens are assigned to the source. The computing platform may compare the one or more second tokens, with one or more third tokens in the token chain. Based on the comparison, the computing platform may determine whether the one or more second tokens correspond to the one or more third tokens. The computing platform may generate, an authentication message. The authentication message may indicate, when the one or more second tokens correspond to the one or more third tokens, that the user validation request is a valid request. The authentication message may indicate, when the one or more second tokens do not correspond to the one or more third tokens, that the user validation request is an invalid request. The computing platform may transmit, to the source, the authentication message.

In some arrangements, the token request may comprise an indication of a number of the one or more second tokens.

In some arrangements, when the one or more second tokens correspond to the one or more third tokens, the computing platform may deactivate the one or more third tokens. The computing platform may generate a token deactivation message, where the token deactivation message may indicate the one or more second tokens. The computing platform may transmit, via the communication interface and to the user token device, the token deactivation message.

In some arrangements, storing the first token may comprise storing only a first portion of the first token. Transmitting the first token may comprise transmitting only a second portion of the first token. The computing platform may generate, based on the first portion of the first token and the second portion of the first token, a checksum. The computing platform may store, in the memory, the checksum, where storing the checksum comprises associating the checksum with the first portion of the first token.

In some arrangements, the computing platform may receive a request to deactivate one or more second tokens stored in the memory. The computing platform may, based on the request, deactivate the one or more second tokens.

In some arrangements, the token may comprise a header and a body. The header may comprise an indication of the assignee corresponding to the first token. The body may comprise a value generated based on the received user information.

In some arrangements, the assignee may correspond to one of a device, a system, or an application.

In some arrangements, the user information, may comprise at least one of user biological information, user location information, or information corresponding to user activity in a network associated with the computing platform.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for a token-based authentication mechanism, in accordance with one or more example embodiments;

FIG. 3A shows an example token chain corresponding to a particular user as stored in an authentication database, in accordance with one or more example embodiments;

FIG. 3B shows an example personal token chain as stored in a user token device corresponding to a user, in accordance with one or more example embodiments;

DETAILED DESCRIPTION

Figure 1A:
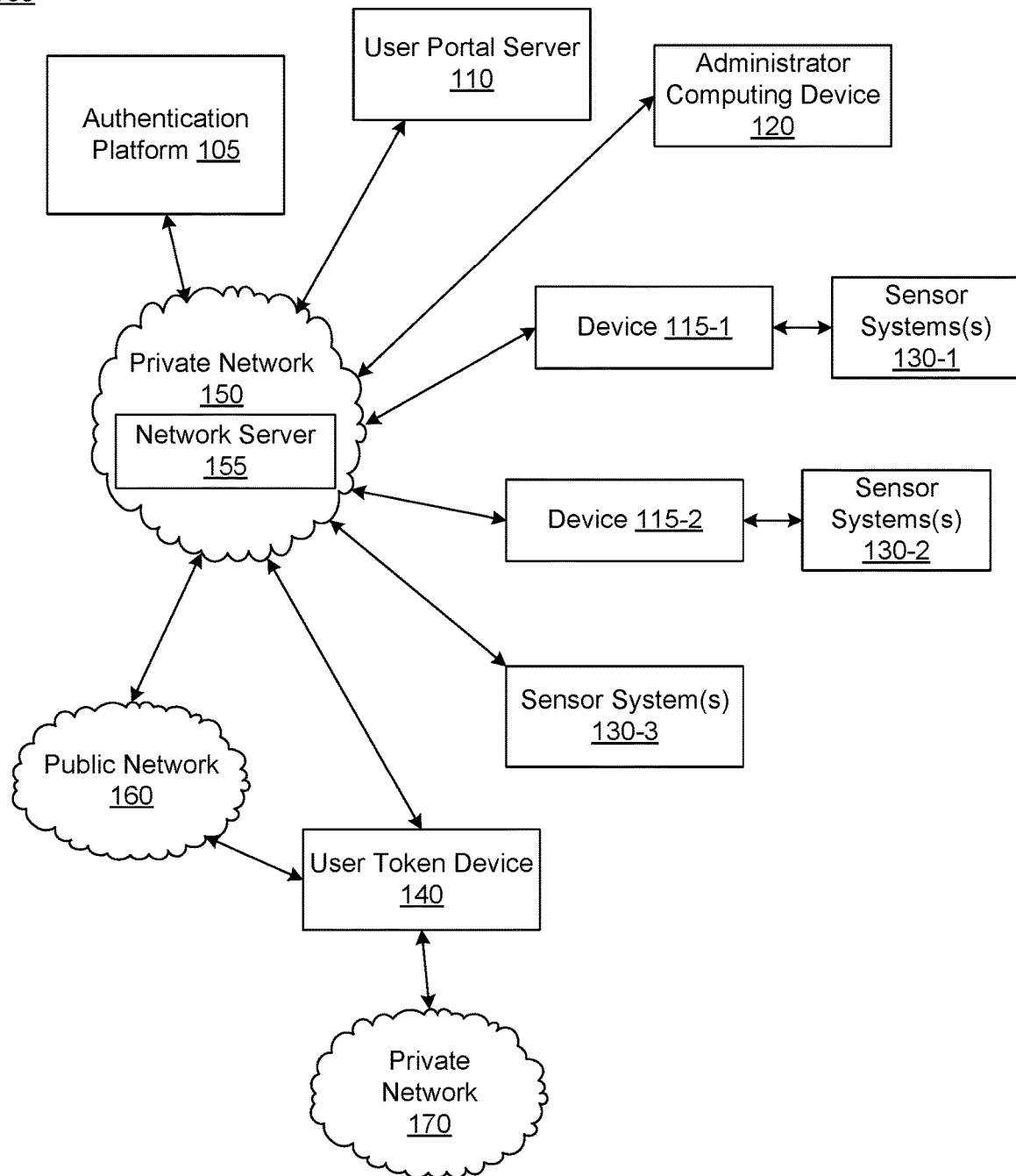
FIGS. 1A-1C show an illustrative computing environment for a token-based authentication mechanism, in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various mechanisms may be employed for securing computing devices, networks, restricted systems and/or the like from access by unauthorized users. For example, an enterprise network (e.g., corresponding to a corporate entity) may secure its systems and segregate information by allocating each authorized user a corresponding user-specific account/computing system, and allowing access to the user-specific account/computing system based on a password that is only known to the user. Banking systems often use a passcode-based system that allows a client to set a personal passcode which may be then used by the client to confirm user identity. Such mechanisms, however, may be vulnerable to unauthorized access by malicious actors. For example, a password/passcode may be compromised which may then be used to gain unauthorized access. Further, a user often has to remember/maintain passwords for multiple systems. As a result, some users may prefer to reuse passwords across multiple systems. This may result in increased vulnerability.

A security token may be used for securing user access to a device, system, or application. A security token may be used as an alternative to, or in addition to, traditional password/passcode-based authentication methods. A system may provide an authorized user with one or more security tokens which may be used, by the user, to gain access to the system. Tokens may be generated and used in a manner that is transparent to the user, thereby reducing user-burden to remember and/or maintain a list of passwords for different systems. Various aspects of this disclosure relate to devices, systems, and methods for providing enhanced security to sensitive data, communication networks, and providing access control. Tokens may be generated based on user-specific data, resulting in tokens that are truly unique and not replicable by a malicious actor.

Some aspects of this disclosure relate to the use of sensors to monitor and measure various user parameters associated with a user. An authentication platform may generate, based on the user parameters, one or more tokens. The tokens may be transmitted to a user token device, which may then be used to authenticate a user access to a particular system. In an arrangement, different number of tokens may be used for different access levels. In an arrangement, the user token device may store tokens corresponding to multiple devices, systems, applications, and/or private networks. In an arrangement, a user may be authenticated based on tokens that are generated based on parameters that correspond to other, associated user(s).

In an arrangement, token-based authentication mechanisms described herein may be used in enterprise organization that seek to segregate information and control access to different enterprise systems among different clients/users/departments. Access controls may be implemented, for example, to protect sensitive data of clients (e.g., users availing services provided by an enterprise organization) corresponding to the enterprise organization. Types of measurements used for token-generation, sensors used, and levels of access control may be implemented, based on knowledge and authorization of employees of the enterprise organization, to secure sensitive information of the enterprise organization and/or its clients. In an arrangement, token-based authentication mechanisms described herein may be to provide security and access control to a residence.

Figure 1B:
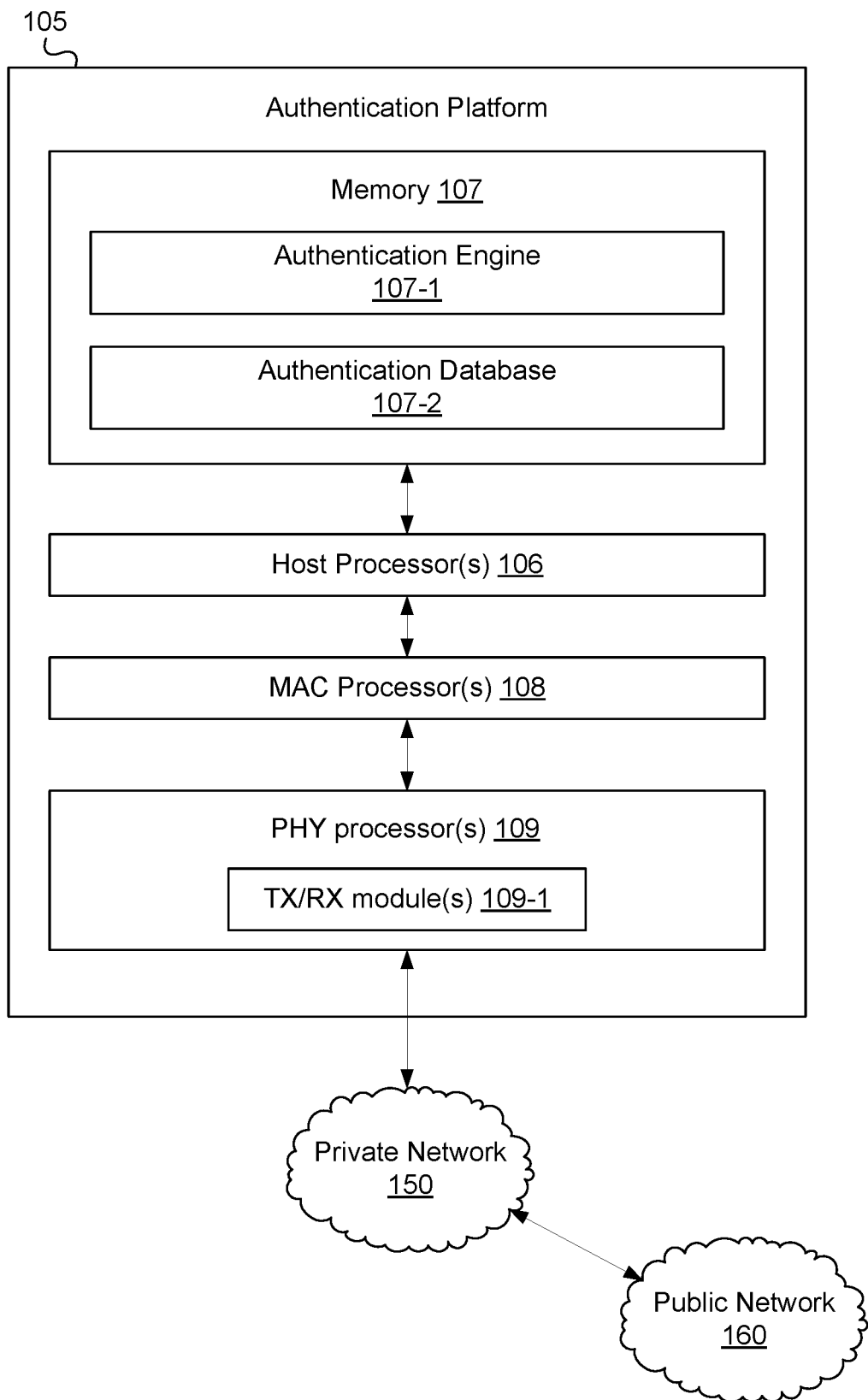
Figure 1C:
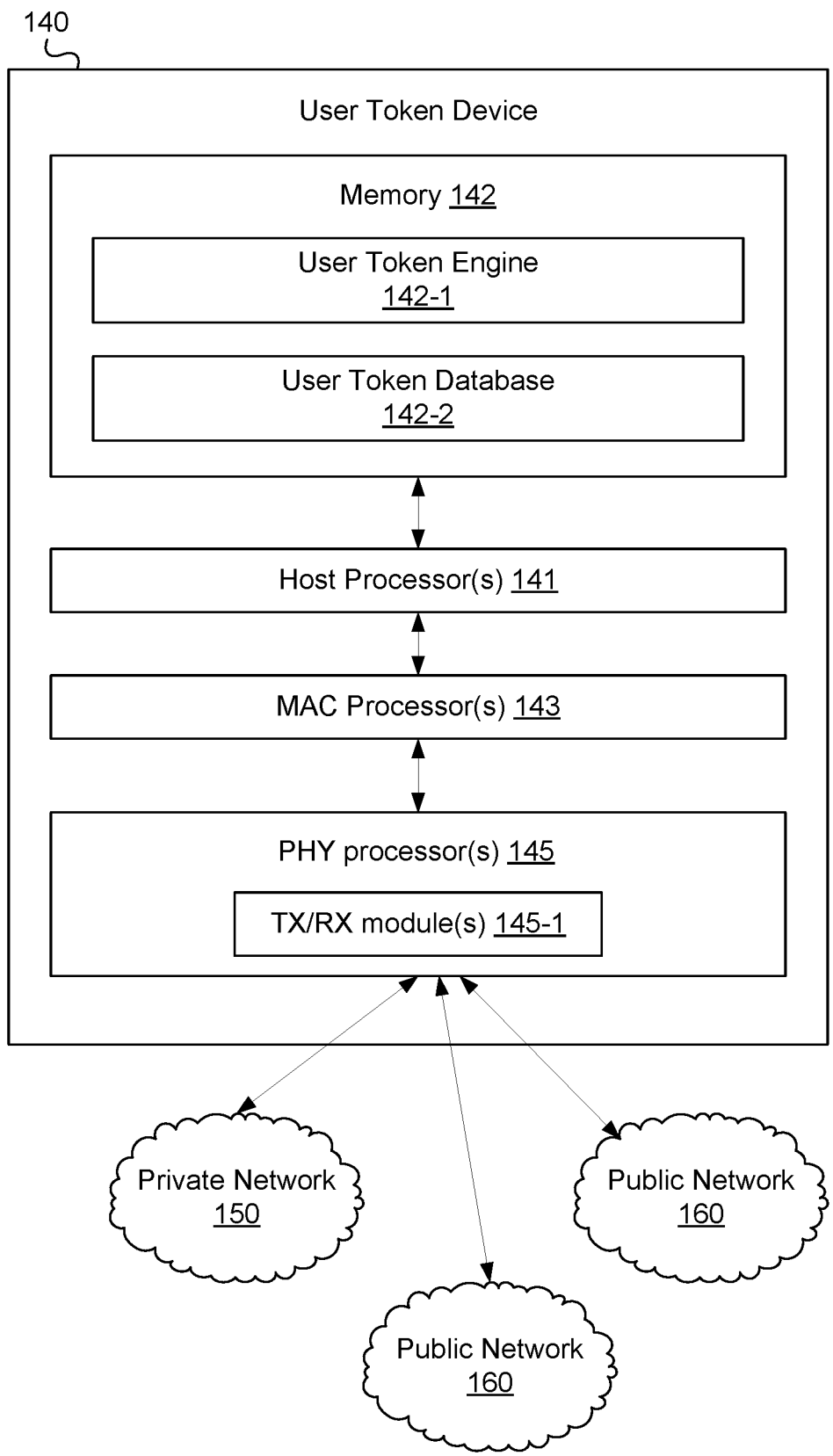

FIGS. 1A, 1B, and 1C depict an illustrative computing environment for a token-based authentication mechanism, in accordance with one or more example embodiments. Referring to FIG. 1A, a computing environment 100 may comprise one or more devices (e.g., computer systems, communication devices, authentication devices, and/or networked sensors). The computing environment 100 may comprise, for example, an authentication platform 105, a user portal server 110, an administrator computing device 120, device(s) 115 (e.g., a device 115-1 and/or a device 115-2), sensor system(s) 130 (e.g., a sensor system 130-1, a sensor system 130-2, and/or a sensor system 130-3), a user token device 140, and/or the like. The computing environment 100 may comprise a private network 150 (which may, e.g., interconnect the authentication platform 105, the user portal server 110, the administrator computing device 120, the device(s) 115, the sensor system(s) 130, the user token device 140) and a public network 160. The private network 150 may use wired and/or wireless communication protocols. The private network 150 may, for example, correspond to a local area network (LAN), a wide area network (WAN), International Institute of Electrical and Electronics Engineers (IEEE) Standard 802.11a/b/g/n/ac/ax "Wi-Fi" protocol, a peer-to-peer network, or the like.

In an arrangement, the private network 150 may correspond to a network corresponding to an enterprise organization. A user in a context of the computing environment 100 may, for example, be an associated user (e.g., an employee, an affiliate, a client, or the like) of an enterprise organization operating/associated with the private network 150. An external user (e.g., a client) may avail services being provided by the enterprise organization, and access one or more resources located within the private network 150. An enterprise organization may correspond to any government or private institution, an educational institution, a financial institution, health services provider, retailer, or the like. In an arrangement, the private network 150 may correspond to a home network, and a user in a context of the computing environment 100 may be a resident associated with the home network. Users may operate one or more devices in the computing environment 100 to send messages to and/or receive messages from one or more other devices connected to the computing environment 100.

As illustrated in greater detail below, the authentication platform 105 may comprise one or more computing devices configured to perform one or more of the functions described herein. The authentication platform 105 may comprise, for example, one or more computers (e.g., laptop computers, desktop computers, servers, server blades, or the like).

User portal server 120 may be configured to provide one or more portal interfaces to one or more user devices. In an arrangement where the private network 150 corresponds to an enterprise organization network, the user portal server 120 may be configured to provide an employee access portal that may be used to gain access to an enterprise system (e.g., a computing system, a computing environment, an application, and/or the like) within the enterprise organization. Such portals may, for instance, provide employees of an enterprise organization with access to client information, remote work functionalities, enterprise mail systems, back-office functions, classified enterprise information, and/or the like. In an arrangement, the user portal server 120 may be configured to provide an online service portal that may, for instance, enable clients of the enterprise organization with access to account/membership information (e.g., account balance information, account statements, recent transaction history information, and/or the like). In an arrangement, the user portal server 120 also may be configured to provide a mobile portal that is accessible to users (e.g., employees, clients) on mobile computing devices. In an arrangement where the private network 150 corresponds to a home network, the user portal server 120 may be configured to provide a personal access portal that may be used to gain access to various connected devices, systems, and/or applications in a home network.

The administrator computing device 120 may be a personal computing device (e.g., desktop computer, laptop computer) or mobile computing device (e.g., smartphone, tablet). The administrator computing device 120 may be linked to and/or operated by an administrative user (e.g., a network administrator of an enterprise organization). The administrator computing device 120 may receive data from the authentication platform 105, manipulate and/or otherwise process such data, and/or return processed data and/or other data to the authentication platform 105 and/or to other computer systems in the computing environment 100. The administrator computing device 120 may be configured to control operation of the authentication platform 105 and/or the private network 150.

The device(s) 115 (e.g., the device 115-1 and/or the device 115-2) may be personal computing devices (e.g., desktop computers, laptop computing devices, smartphones, tablets, wearable devices). In an arrangement, the device(s) 115-1 and 115-2 may be associated with (e.g., assigned to, owned, and/or operated by) corresponding different users. In an arrangement, the devices 115 (e.g., the device 115-1 and/or the device 115-2) may be security devices (e.g., a keycard/keypad device) that control access to a secure area (e.g., a room, a residence). In an arrangement, the device(s) 115 may be smart home appliances (e.g., speaker, television, thermostat). In an arrangement, the device(s) 115 may be other types of devices operable to communicate over the private network 150.

In an arrangement where the private network 150 corresponds to a network operated by an enterprise organization, the device 115-1, for example, may be a computing device, linked to and/or operated by a user (e.g., an employee, a client) associated with the enterprise organization, that may be used to interact with one or more enterprise resources. In an arrangement where the private network 150 corresponds to a home network, the device 115-1, for example, may be a security device that controls access to secure areas (e.g., a room, a residence).

The device(s) 115 may use a communication protocol (e.g., a "Wi-Fi" protocol, a cellular protocol, a LAN network, a WAN network, and/or the like) to connect to the one or more devices in the computing environment 100, and/or to the private network 150 and/or to the public network 160. The device(s) 115, for example, may use a Wi-Fi communication protocol to establish a connection with an access point associated with the private network 150. The device 115, for example, may use a 5G cellular protocol to establish a connection with a picocell or a femtocell associated with a 5G service provider, and connect to the public network 160.

One or more of the sensor system(s) 130 may comprise sensing systems for measurements corresponding to one or more of user biological parameters, environmental parameters, location information, and/or the like. The sensor system(s) 130 may be used for the measurements corresponding to a user of a device in the private network 150 (e.g., the device(s) 115), process the measurements, and/or transmit processed data to other devices within the computing environment 100. The sensor system 130-1 and 130-2 may be communicatively coupled and/or integrated with the device 115-1 and the device 115-2, respectively. The sensor system(s) 130 may further include processors, memories, TX/RX module(s), or the like, to measure, process and/or transmit the data to other devices within the computing environment 100.

The sensors system(s) 130 may comprise cameras (visible light, infrared, or the like), microphones, thermometers, GNSS modules, and/or the like. The sensor system(s) 130 may comprise skin conductance sensing systems, pupil dilation measurement systems, eye tracking systems, facial action coding systems (FACS), and/or other biological measurements systems. Biological parameters measured at one or more sensor system(s) 130 may correspond to one or more of fingerprint, voiceprints, photo/video data, skin conductance, iris dilation, facial actions, and/or the like.

The sensor system(s) 130 may be non-intrusively integrated into one or more other devices in the computing environment 100. Electrodes of a skin conductance sensor, for example, may be integrated into a mouse, a keyboard, and/or a fingerprint scanner. Cameras for eye tracking systems, pupil dilation measurement systems, and FACS, for example, may be integrated into a computer monitor corresponding to the device 115-1 or 115-2.

One or more of the sensor system(s) 130 may comprise temperature sensing systems. Temperature sensing systems may measure, for example, an atmospheric temperature.

Data measured at one or more sensor system(s) 130 may correspond to location information. Location information may comprise, for example, GNSS coordinates (e.g., global positioning system, GPS, coordinates), indication (e.g., identification information) corresponding to a 5G femtocell the device 115 is connected to, indication (e.g., identification information) corresponding to a Wi-Fi access point the device 115 is connected to, and/or the like.

The user token device 140 may be associated with a particular user. The user token device 140 may be a personal communication device (e.g., a mobile computing device, a mobile communication device, a smart watch), a smart patch, a key card, a smart bracelet, a wearable device, or any device that is configured to perform one or more functions described herein. The user token device 140 may be a device with a built-in memory and transmit/receive (TX/RX) modules that is configurable to receive, store and/or transmit authentication tokens as described herein. The user token device 140 may communicate with a device (e.g., the device 115-1 or the device 115-2) and/or the authentication platform 105, and receive/transmit the tokens and/or other messages as described herein. In an arrangement, the user token device 140 may comprise one or more sensor systems (e.g., similar in function to the sensor system(s) 130).

Transmission and reception of information between the user token device 140 and the authentication platform 105 and/or other devices may be through an intermediary device (e.g., the device 115-1). In an arrangement, the user token device 140 may receive/transmit tokens and/or other messages using IEEE Standard 802.15.1 ("Bluetooth"), IEEE Standard 802.11 ("Wi-Fi"), and/or near-field communication (NFC) links. The user token device 140 may connect, for example, using a Bluetooth connection, to the device 115-1, and communicate with the authentication token platform 105 (or any other device in the computing environment 100), using the device 115-1 as an intermediary. In an arrangement, the user token device 140 may limit its communication range by using low-power TX/RX modules. Limiting the user token device 140 to using short-range communication technologies (e.g., Bluetooth, NFC technology) or using low-power modules may improve security of tokens stored in the user token device 140. Using short-range communication technologies may, for example, prevent a potential attacker from remotely stealing authentication tokens stored in the user token device 140. In an arrangement, the user token device 140 may use other wired and/or wireless communication protocols.

The network server 155 may perform one or more functions corresponding to maintaining connectivity and controlling access to resources within the private network 150. The network server 155 may be, for example, a gateway to the public network 160, for devices connected to the private network 150. The network server 155 may enforce network access controls on one or more devices in the private network 150. The network server 155 may control access to a particular device, system, and/or sub-system, in the private network 150. In various arrangements, one or more other devices (e.g., the authentication platform 105, the enterprise host platform 110, and/or the access control administrator computing device 120) may, alone or in combination, perform one or more functions of the network server 155.

While FIG. 1 shows that the device(s) 115, the sensor system(s) 130, and the user token device 140 are connected directly to the private network 150, in other arrangements, one or more of the device(s) 115, the sensor system(s) 130, and the user token device 140 may connect to the private network 150 through the public network 160. The device(s) 115, the sensor system(s) 130, and/or the user token device 140 may transmit/receive information from one or more other devices in the private network 150, for example, while connected to the public network 160.

Private network 170 may be another private network, different from the private network 150. The private network 170 may comprise one or more other computing devices that perform operations similar to operations corresponding to computing devices described with reference to the private network 150. The user token device 140 may operate in the private network 170 in a manner similar to its operation with respect to the private network 150.

The authentication platform 105, the user portal server 110, the administrator computing device 120, the device(s) 115, and/or one or more other systems/devices in the computing environment 100 may be any type of computing device capable of receiving input via a user interface, and communicating the received input to one or more other computing devices. The authentication platform 105, the user portal server 110, the administrator computing device 120, the device(s) 115, and/or other systems/devices in the computing environment 100 may be and/or include, in some instances, server computers, desktop computers, laptop computers, tablet computers, smart phones, wearable devices, or the like that may be comprised of one or more processors, memories, communication interfaces, storage drives, and/or other components. Any and/or all of the authentication platform 105, the user portal server 110, the administrator computing device 120, the device(s) 115, and/or other systems/devices in the computing environment 100 may be, in some instances, special-purpose computing devices configured to perform specific functions.

Referring to FIG. 1B, the authentication platform 105 may comprise one or more of host processor(s) 106, memory 107, medium access control (MAC) processor(s) 108, physical layer (PHY) processor(s) 109, TX/RX module(s) 109-1, or the like. One or more data buses may interconnect host processor(s) 106, memory 107, MAC processor(s) 108, PHY processor(s) 109, and/or Tx/Rx module(s) 109-1. The authentication platform 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages and/or information transmitted from and/or received at devices/systems in the computing environment 100 may be encoded in one or more MAC data units and/or PHY data units. The MAC processor(s) 108 and/or the PHY processor(s) 109 of the authentication platform 105 are configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the TX/RX module(s) 109-1 over the private network 150 and/or the public network 160. Similarly, the PHY processor(s) 109 may receive PHY data units from the TX/RX module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the authentication platform 105 are configured to execute machine readable instructions stored in memory 107. Memory 107 may comprise (i) one or more program modules/engines having instructions that when executed by the one or more processors cause the authentication platform 105 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the authentication platform 105 and/or by different computing devices that may form and/or otherwise make up the authentication platform 105. For example, memory 107 may have, store, and/or comprise an authentication engine 107-1, and an authentication database 107-2. The authentication engine 107-1 may have instructions that direct and/or cause the authentication platform 105 to perform one or more operations, as discussed in greater detail below. The authentication engine 107-1 may have instructions that, for example, direct the authentication platform 105 to generate one or more tokens corresponding to users and authenticate tokens received from the user token device 140. The authentication database 107-2 may store, for example, tokens generated by the authentication engine 107-1.

While FIG. 1A illustrates the authentication platform 105 as being separate from other elements connected in private network 150, in one or more other arrangements, the authentication platform 105 may be included in one or more of the user portal server 110, the administrator computing device 120, and/or any device associated with the private network 150. Elements in the authentication platform 105 (e.g., host processor(s) 105, memory(s) 107, MAC processor(s) 108, PHY processor(s) 109, and TX/RX module(s) 111, one or more program modules stored in memory(s) 107) may share hardware and software elements with and corresponding to, for example, one or more of the user portal server 110, the administrator computing device 120, and/or any device associated with the private network 150.

Referring to FIG. 1C, the user token device 140 may comprise one or more of host processor(s) 141, memory 142, medium access control (MAC) processor(s) 143, physical layer (PHY) processor(s) 145, TX/RX module(s) 145-1, or the like. One or more data buses may interconnect the host processor(s) 141, the memory 142, the MAC processor(s) 143, the PHY processor(s) 145, and/or the TX/RX module(s) 145-1. The user token device 140 may be implemented using one or more integrated circuits (ICs), software, or a combination thereof, configured to operate as discussed below. The host processor(s) 141, the MAC processor(s) 143, and the PHY processor(s) 109 may be implemented, at least partially, on a single IC or multiple ICs. Memory 142 may be any memory such as a random-access memory (RAM), a read-only memory (ROM), a flash memory, or any other electronically readable memory, or the like. Messages and/or information transmitted from and/or received at devices/systems in the computing environment 100 may be encoded in one or more MAC data units and/or PHY data units. The TX/RX module(s) 145-1 may transmit and/or receive messages over the private network(s) 150/170 and/or the public network 160. The user token device 140 may further comprise a display device. The display device may be used to indicate a location of tokens, as discussed in greater detail below.

One or more processors (e.g., the host processor(s) 141, the MAC processor(s) 143, the PHY processor(s) 145, and/or the like) of the user token device 140 may be configured to execute machine readable instructions stored in memory 142. Memory 142 may comprise (i) one or more program modules/engines having instructions that when executed by the one or more processors cause the user token device 140 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the user token device 140. For example, memory 142 may have, store, and/or comprise a user token engine 142-1, and a user token database 142-2. The user token engine 142-1 may have instructions that direct and/or cause the user token device 105 to perform one or more operations, as discussed in greater detail below. The user token engine 142-1 may have instructions that, for example, direct the user token device 105 to store received tokens and/or retrieve tokens. The user token database 142-2 may be used to store tokens received by the user token device 140.

FIGS. 2A-2D depict an illustrative event sequence for a token-based authentication mechanism, in accordance with one or more example embodiments. The illustrative event sequence is described with reference to the computing environment 100 merely as an example. In other embodiments, the illustrative event sequence occurs in a computing environment different from the computing environment 100. In various arrangements described herein, the authentication platform 105, the user token device 140, and/or other device(s) in the computing environment 100 may use one or more algorithms that are based on one or more steps described with reference to FIGS. 2A-2D to implement token-based authentication mechanisms.

Figure 2A:
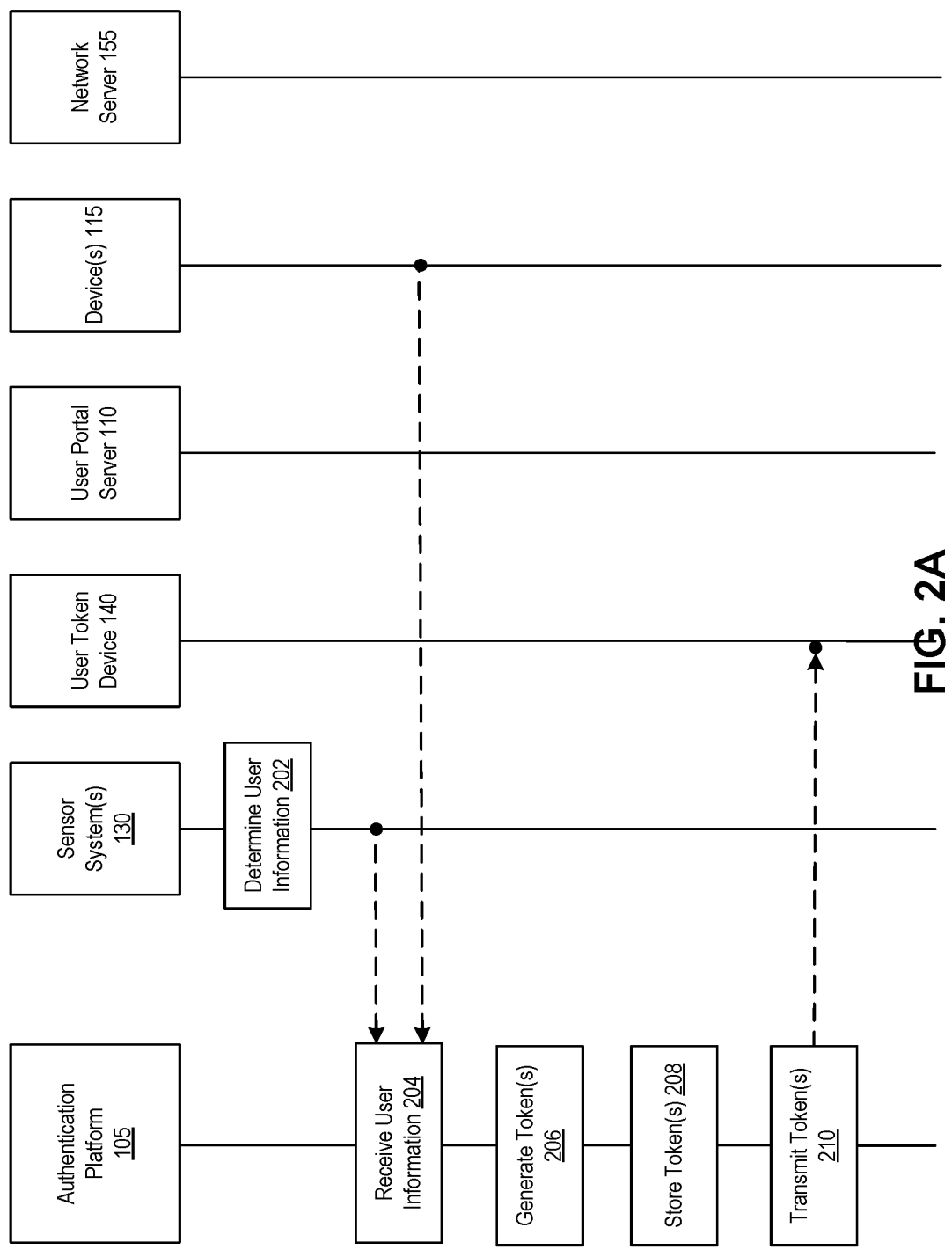
Figure 2B:
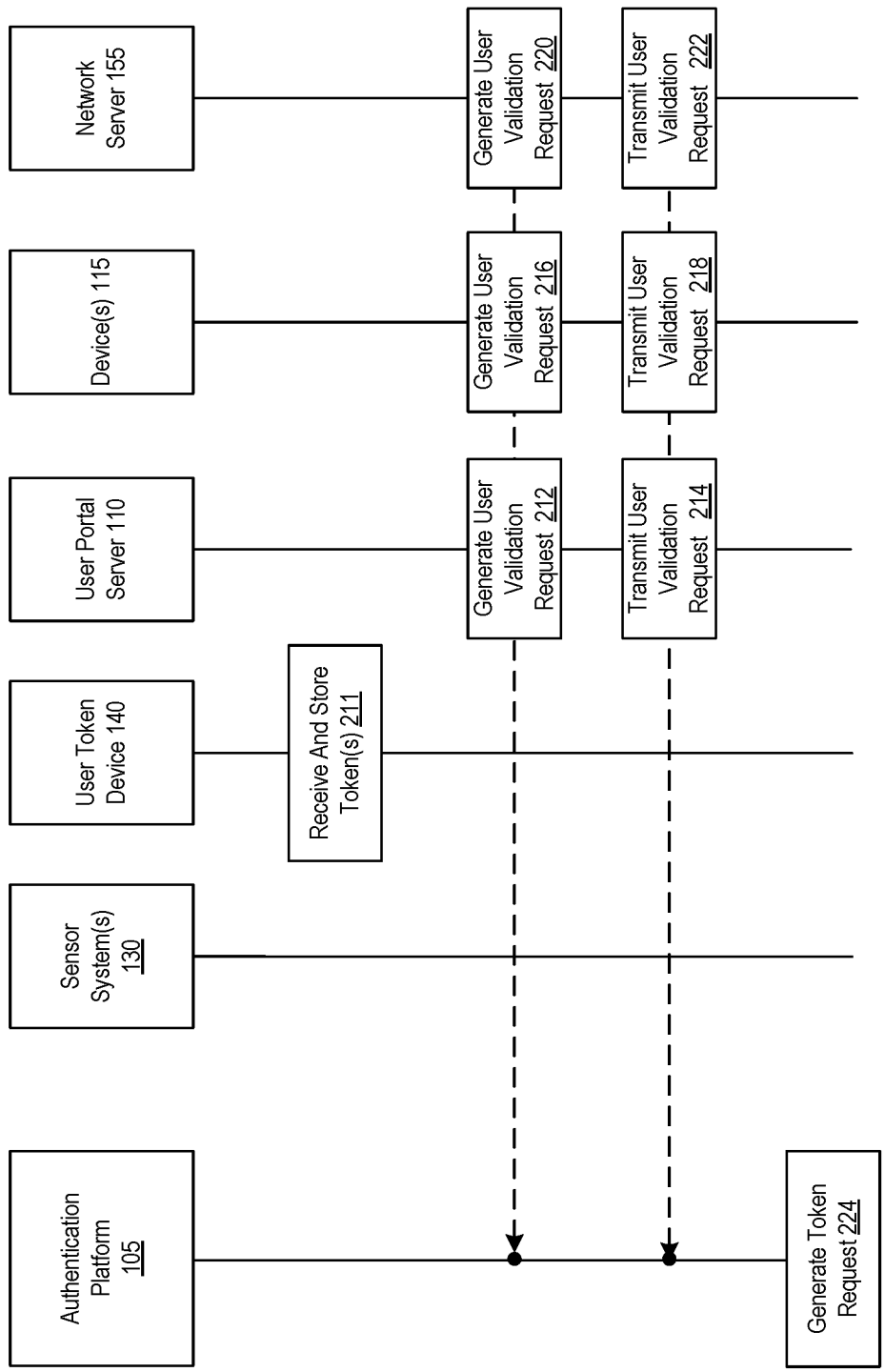
Figure 2D:
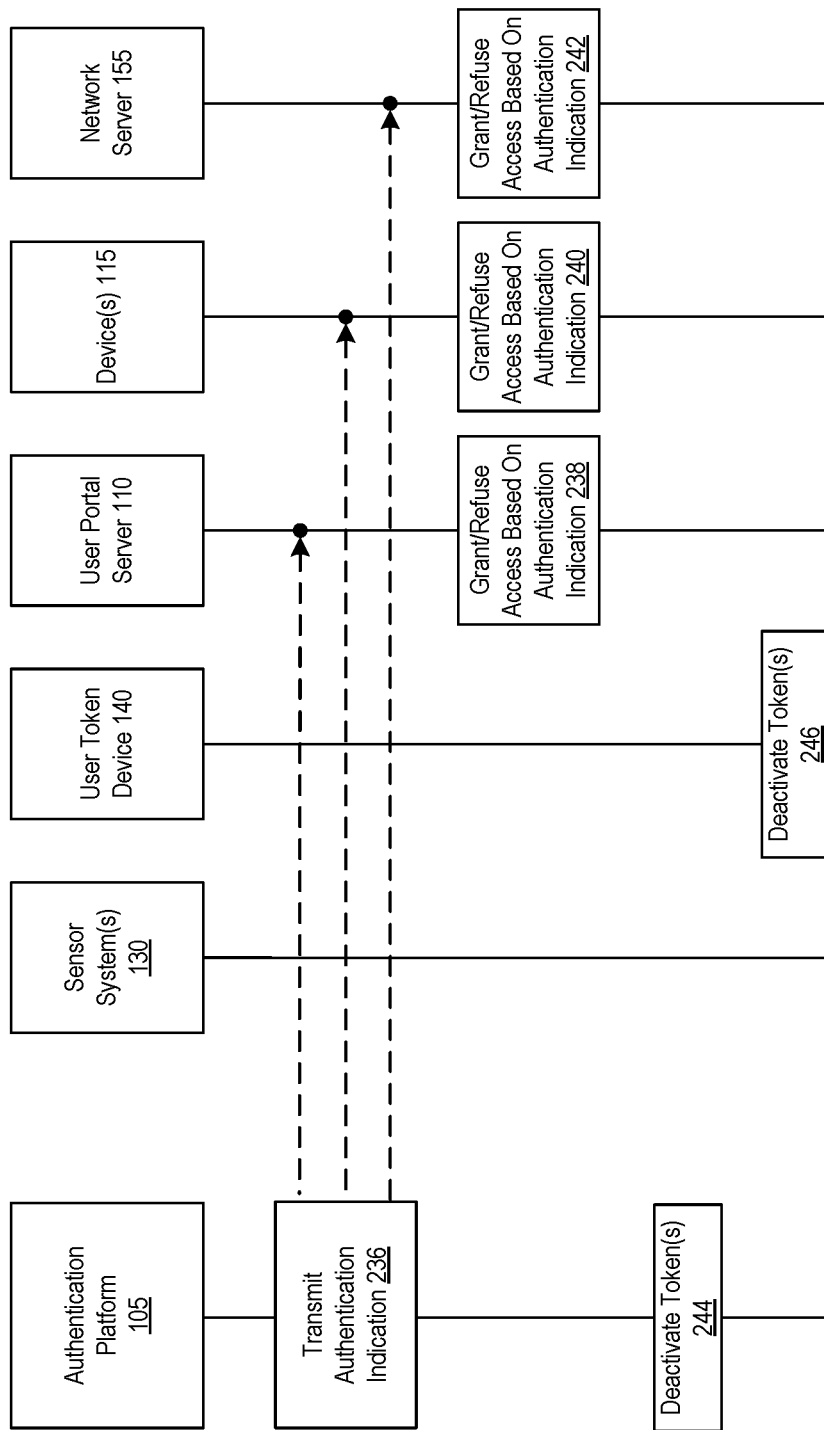

Referring to FIG. 2A, at step 202, one or more of the sensor system(s) 130 may determine user information corresponding to a particular user in the private network 150. The user information may correspond to biological information, location information, temperature information, and/or the like. The biological information may comprise, example, measurements obtained by one or more sensor system(s) 130. In an arrangement, one or more sensor system(s) 130 may measure user biological information. In an arrangement where the user token device 140 may comprise one or more sensor systems, the user information may be determined by the one or more sensor systems in the user token device 140.

In an arrangement, the sensor system 130-1 may determine user information corresponding to a user operating the device 115-1. In an arrangement where the device 115-1 is a mobile communication device (e.g., a smartphone, a smartwatch) corresponding to the user, the sensor system 130-1 may comprise a GNSS module, and the user information may comprise GNSS coordinates corresponding to the device 115-1. In an arrangement where the sensor system 130-1 may comprise a microphone, and the user information may comprise a voiceprint corresponding to the user. In an arrangement, the sensor system 130-1 may comprise a thermometer, and the user information may comprise an ambient temperature as measured by the thermometer. In an arrangement, the device 115-1 may determine a user action based on measurements by the sensor system(s) 130. The device 115-1 may determine, for example, based on measurements by the GNSS module, that the user is stationary/moving and/or may determine a speed of user movement. In an arrangement, the sensor system 130-3 may comprise, for example, a thermometer/thermostat that may measure a temperature corresponding to a user location (e.g., an office space corresponding to the user, a residence corresponding to the user).

In an arrangement, the determined user information may comprise multiple measurements by the sensor system(s) 130. In an arrangement, the determined user information may comprise multiple measurements by corresponding multiple different sensor systems 130.

In an arrangement, the user information may comprise user activity within the computing environment 100. The user information may comprise, for example, identifications of login devices corresponding to the user (e.g., a device identifier, an IP address, a MAC address, etc.), applications accessed by the user, and/or the like.

At step 204, the authentication platform 105 may receive the user information determined by the sensor system(s) 130. In an arrangement, for example, the sensor system(s) 130 may transmit the determined user information to the authentication platform 105. Additionally, or alternatively, for example, the sensor system(s) 130-1 may transmit the user information to the device 115-1, and the device 115-1 may transmit the user information to the authentication platform 105. The sensor system(s) 130 and/or the device(s) 115 may transmit the user information, for example, when the user connects to the private network 150 and/or accesses a resource in the private network 150. In an arrangement where the user token device 140 comprises one or more sensor systems, the authentication platform may receive user information determined and transmitted by the user token device 140.

At step 206, the authentication platform 105 may generate a token based on the received user information. In an example, the authentication platform 105 may generate a token based on the user information (e.g., location information, biological information, temperature information, user activity, and/or the like). In an example, the authentication platform 105 may use an indication of a user action (e.g., determined based on the user information), to generate the token.

In an example, the authentication platform 105 may use one or more of mathematical operations, encryption operations, encoding operations, and/or the like to generate a token (or a portion thereof) based on the user information. The determined user information (e.g., location information, biological information, temperature information, user activity, user action, and/or the like) may be represented in a numerical format, for example, and used to generate tokens based on the one or more operations.

Generating the token, at the authentication platform 105, may comprise determining an assignee (e.g., a device, a system, an application, and/or the like) of the token. In various arrangements, the token may be assigned for use with the private network 150, the user portal server 110, the device(s) 115, and/or one or more other devices/systems/applications corresponding to the private network 150. A token may be assigned for use with an application operating on the private network 150, the user portal server 110, and/or the device(s) 115. A token may be assigned for use to perform a particular activity in an application operating on the private network 150, the user portal server 110, and/or the device(s) 115. The generated token may comprise an indication of the assignee (e.g., an identification code, a MAC address, an IP address, etc.). In an example, a generated token may comprise a header and a body, and the indication of the assignee may be stored in the header.

A token assigned for use with the private network 150, for example, may be used, by the user, to access the private network 150 (e.g., using a computing device corresponding to the user). In an arrangement where the device 115-1 is a security device that controls access to a secure area, a token assigned for use with the device 115-1 may be used, by the user, to gain access to the secure area. A token assigned for use with an application, for example, may be used, by the user, to access the application and/or perform a particular activity within the application.

At step 208, the authentication platform 105 may store the generated token (e.g., in the authentication database 107-2). The authentication platform 105 may store the token in a token chain corresponding to the user. The authentication platform may repeat steps 204-208 to generate and store multiple tokens. The authentication platform 105 may repeat the steps periodically as per a predefined schedule. Generated tokens may be stored in the token chain, for example, in a chronological manner in which they are generated.

Token chains corresponding to multiple users authorized to access resources in the private network 150 may be stored in the authentication database 107-2. In an arrangement, storing the token in the token chain corresponding to the user may further comprise linking the stored token with another token, corresponding to another user, in another token chain. The two tokens may be linked for example using a token connector. The token connector may be, for example, a pointer, stored with the generated token (e.g., in a header of the generated token), that indicates a location of the another token. The another token may be assigned, for example, to a same assignee as the token generated at step 206.

At step 210, the authentication platform 105 may transmit the generated token to the user token device 140 corresponding to the user. In an arrangement where the generated token is linked to another token corresponding to another user, both the generated token and the another token are transmitted to the user token device 140. In an example, with reference to steps 206-210, the authentication platform may generate, store and transmit a plurality of tokens corresponding to the user and/or the another user.

In an arrangement, step 208 may comprise storing only a first portion of the token. In one such arrangement, step 210 may comprise transmitting only a second portion of the token to the user token device 140. The first portion and/or the second portion may comprise an indication of the assignee of the token. In one such arrangement, the authentication platform may generate, based on the first portion and the second portion and using one or more mathematical operations, a checksum. The checksum may be stored in the authentication platform 105. The checksum may be associated with (e.g., stored with, or linked to) the first portion of the token. The checksum may be stored, for example, in a header associated with the first portion of the token.

At step 211, the user token device 140 may receive and store token(s). The user token device 140 may store the received token(s) in a memory (e.g., the user token database 142-2) corresponding the user token device 140. The user token device 140 may store the token(s) in a personal token chain corresponding to the user. In an arrangement where the authentication platform 105 transmits a linked token in addition to a token generated based on the user information, the user token device 140 may store both tokens, and link the two tokens using a token connector. In an arrangement where the authentication platform 105 only transmits a portion of a token, receiving and storing a token may correspond to receiving and storing only a portion of the token.

Alternatively, the user token device 140 may receive the token(s) and forward the token(s) to an online token repository, corresponding to the user, for storage. The online token repository may store the token(s) in a personal token chain corresponding to the user. The online token repository may comprise multiple tokens corresponding to different private networks (e.g., the private network 150 and the private network 170). Tokens, corresponding to different private networks, may be accessed in the online token repository, for example, using one or more uniform resource locators (URLs). The online token repository may be, for example, a cloud storage system that is accessible via the public network 160. The cloud storage system may comprise one or more memory storage devices, processors, and communication interfaces configured to receive, store, and transmit token(s). The cloud storage system may comprise, for example, one or more computers (e.g., laptop computers, desktop computers, servers, server blades, or the like).

The authentication platform 105 may transmit, and the user token device 140 and/or the online token repository may receive multiple tokens over time. The received tokens may be stored chronologically in the order in which the tokens are received at the user token device 140 (or the online token repository). The user token device 140 (or the online token repository) may store tokens corresponding to multiple different private networks (e.g., the private network 150 and/or the private network 170). In an arrangement where the authentication platform 105 transmits only a portion of a generated token (e.g., the second portion as described above), the user token device 140 and/or the online token repository may receive and store the portion of the token.

Steps 212-222 correspond to generation and transmission of user validation request(s) within the computing environment 100. A user validation request may originate from a source (e.g., a device, a system, an application, and/or the like). The source may generate a user validation request, for example, if a user requests access to resources corresponding to the source. The user validation request may comprise an indication (e.g., an identification code, MAC address, IP address, etc.) corresponding to the source. The user validation request may comprise an identification of the user (e.g., a user name, a user ID, an employee ID, etc.) corresponding to the source.

At steps 212 and 214, the user portal server 110 may generate the user validation request, and transmit the user validation request to the authentication platform 105. The user portal server 110 may generate and transmit the user validation request, for example, in response to a user requesting access to content stored and/or an application operating on the user portal server 110 and/or perform a particular activity within the application.

Alternatively, at steps 216 and 218, the device 115-1 may generate the user validation request, and transmit the user validation request to the authentication platform 105. The device 115-1 may generate and transmit the user validation request, for example, in response to a user request to operate the device 115-1, a user request to enter a secure area for which access is controlled by the device 115-1, or the like. An application operating on the device 115-1 may generate the user validation request, for example, in response to a user request to use an application operating on the device 115-1 and/or perform a particular activity within the application.

Alternatively, at steps 220 and 222, the network server 155 may generate the user validation request, and transmit the user validation request to the authentication platform 105. The network server 155 may generate and transmit the user validation request, for example, in response to a user request to connect a device to the private network 150. An application operating on the network server 155 may generate the user validation request, for example, in response to a user request to use an application operating on the network server 155 and/or perform a particular activity within the application.

A source (e.g., a device, a system, an application, and/or the like) may generate a user validation request, for example, if a user inputs credentials corresponding to a user account (e.g., a user account associated with the private network 150, a user account associated with a device in the private network 150, a user account associated with an application operating in the private network 150, and/or the like). The credentials may correspond to, for example, a username and/or a password.

At step 224, the authentication platform 105 may generate a token request to request token(s) from the user token device 140. The authentication platform 105 may generate the token request based on the received user validation request (e.g., the user validation request as received at step 214, 218, and/or 222). The token request may indicate a source corresponding to the user validation request. In an arrangement, the token request may comprise an indication (e.g., an identification code, MAC address, IP address, etc.) of the source. In an arrangement where the source corresponds to an application, the token request may indicate a particular activity in the application corresponding to the user request.

In an arrangement, the token request may comprise an indication of a number of tokens (e.g., 1, 2, 5, 10, 50, or the like) requested from the user token device 140. The number of tokens may be determined by the authentication platform based on an identity of the user, a source corresponding to the user validation request, an identification of the user, and/or the like. A higher number of requested tokens may correspond to a more robust authentication procedure. In an arrangement, the authentication platform may request a first number of tokens if the user validation request corresponds to a request for access to a first resource, and may request a second number of tokens, greater than the first number of tokens, if the user validation request corresponds to a request for access to a second resource, wherein the second resource requires a higher degree of security. At step 226, the authentication platform 105 may transmit the token request to the user token device 140.

While steps 212-226 show a source generating and transmitting a user validation request to the authentication platform 105, and the authentication platform 105 generating and transmitting a token request to the user token device 140, in other arrangements, the source may generate and transmit a token request to the user token device 140. The source may generate and transmit the token request, for example, if a user requests access to resources corresponding to the source. In an arrangement, the token request may comprise an indication (e.g., an identification code, MAC address, IP address, etc.) of the source. In an arrangement, the token request may comprise an indication of a number of tokens requested from the user token device 140. The source may generate the token request, for example, if a user inputs credentials corresponding to a user account (e.g., a user account associated with the private network 150, a user account associated with a device in the private network, a user account associated with an application operating in the private network 150, and/or the like). The credentials may correspond to, for example, a username and/or a password. The source may, for example, transmit the token request, to the user token device 140, using Bluetooth, Wi-Fi, and/or NFC links, or the like.

At step 228, the user token device 140 may retrieve, based on receiving the token request, token(s) from the personal token chain corresponding to the user. The user token device 140 may retrieve the token(s) that have been assigned to the source identified in the token request. The user token device 140 may retrieve a number of tokens as indicated in the token request. In an arrangement, retrieving the token(s) comprises retrieving latest stored token(s) in the user token device 140. In an arrangement, retrieving the token(s) may comprise retrieving linked token(s), if any. The user token device 140 may retrieve the token(s) from a memory associated with the user token device 140 (e.g., the user token database 142-2).

In an arrangement, if the user token device 140 does not have a number of tokens (in the personal token chain) equal to the number of tokens as indicated in the token request, the user token device 140 may generate and transmit a message to the authentication platform 105 that indicates that the user does not have enough tokens. In an arrangement, based on receiving the message, the user authentication platform 105 may generate and transmit an authentication message, to the source, indicating that the user has been denied access/user cannot be validated. In an arrangement, based on receiving the message, the user authentication platform 105 may generate and transmit a new token request, to the user token device 140, indicating that new token(s) may be generated, based on existing tokens in the personal token chain corresponding to the user. The new token request may further indicate a set of one or more mathematical operations that may be used for generation of the new token(s). The user token device 140 may generate the new token(s), based on receiving the new token request and performing the set of one or more mathematical operations. In an arrangement, if the user token device 140 does not have a number of tokens (in the personal token chain) equal to the number of tokens as indicated in the token request, the user token device 140 may automatically generate new token(s) (e.g., using a set of one or more predefined mathematical operations) without receiving a new token request. Retrieving token(s) from the personal token chain corresponding to the user may comprise retrieving only the new tokens, or appending the new tokens to token(s) from the personal token chain corresponding to the user. At step 230, the user token device 140 may transmit the retrieved token(s) to the authentication platform 105.

In an arrangement where the personal token chain corresponding to the user is stored in an online token repository, the user token device 140 may display a code in a display device corresponding to the user token device 140. The code may be, for example, a dynamic QR code that may encode a URL corresponding to the online token repository. The user token device 140 may display the code, for example, in response to receiving the token request. A scanning device, connected to the private network 150, may be configured to scan the code. The scanning device may transmit the code to the authentication platform 105. The authentication platform 105 may, based on the received code, determine the URL, locate the online token repository, and retrieve token(s) from the personal token chain corresponding to the user. The authentication platform may, for example, generate and transmit a token request to the online token repository, wherein the token request indicates a source corresponding to the user validation request. The online token repository may respond to the token request by retrieving token(s) and transmitting token(s) to the authentication platform 105. The online token repository may retrieve and transmit token(s) that have been assigned to the source identified in the token request. For security purposes, a cloud storage system maintaining the personal token chain may update the URL corresponding to the tokens and transmit the updated URL to the user token device 140, after every access by the authentication platform 105.

In an arrangement, if the online token repository does not have a number of tokens (in the personal token chain) equal to the number of tokens as indicated in the token request, the online token repository may generate and transmit a message to the authentication platform 105 that indicates that the user does not have enough tokens. In an arrangement, based on receiving the message, the user authentication platform 105 may generate and transmit an authentication message, to the source, indicating that the user has been denied access/ user cannot be validated. In an arrangement, based on receiving the message, the user authentication platform 105 may generate and transmit a new token request, to the online token repository, indicating that new token(s) may be generated, based on existing tokens in the personal token chain corresponding to the user. The online token repository may respond to the new token request in a manner similar to the user token device 140.

At step 232, the authentication platform 105 may compare received token(s) (e.g., as transmitted by the user token device 140, or an online token repository) with token(s) from the token chain (corresponding to the user) as stored in the authentication platform 105 (e.g., in the authentication database 107-2). Comparing a received token with a token stored in the authentication database 107-2 may comprise determining if the received token(s) correspond to token(s) in the authentication platform 105. Comparing a received token with a token stored in the authentication database 107-2 may comprise comparing the received token with a token that is assigned to the source of the user validation request. A received token may be determined to correspond to a stored token if at least a portion of the received token (e.g., a body of the received token) is identical to at least a portion of the stored token (e.g., a body of the stored token). If the received token(s) comprise linked token(s) that correspond to another user, the authentication platform 105 may compare the linked token(s) with token(s) from another token chain (corresponding to the another user) as stored in the authentication platform 105. The authentication platform 105 may use token connector(s) to find the token(s) from the another token chain.

Based on the comparison, the authentication token platform may determine whether the user validation request is valid. The authentication platform 105 may determine that the user validation request is valid, if the received token(s) correspond to token(s) (e.g., are identical to) as stored in the authentication platform 105. The authentication platform 105 may determine that the user validation request is invalid, if one or more of the received token(s) do not correspond to (e.g., are not identical to) one or more of the token(s) as stored in the authentication platform 105.

In an arrangement where a first portion of a token is stored in the authentication platform 105 and only a second portion of a token is transmitted to the authentication token platform 140 (e.g., as described with reference to steps 208, 210, and 211), steps 228 and 230 may comprise retrieving and transmitting the second portion of the token. In one such arrangement, step 232 may comprise generating, using one or more mathematical operations, a checksum based on a first portion of the token (e.g., as stored in the authentication platform 105) and a second portion of the token (as received), and comparing the checksum to a stored checksum. The authentication platform 105 may determine that the user validation request is valid, if the generated checksum is identical to the stored checksum.

At step 234, the authentication platform 105 may generate an authentication message based on the comparison at step 232. The authentication message may indicate that the user validation request is valid (e.g., the user requesting access to resources corresponding to the source is an authorized user), if the authentication platform 105 determines that the user validation request is valid. The authentication message may indicate that the user validation request is invalid (e.g., the user requesting access to resources corresponding to the source is not an authorized user), if the authentication platform 105 determines that the user validation request is invalid.

At step 236, the authentication platform 105 may transmit the authentication message to the source. The authentication platform 105 may transmit the authentication message to the user portal server 110, for example, if the user portal server 110 transmits the user validation request (at step 214). The authentication platform 105 may transmit the authentication message to the device 115-1, for example, if the device(s) 115-1 transmits the user validation request (at step 218). The authentication platform 105 may transmit the authentication message to the network server 155, for example, if the network server 155 transmits the user validation request (at step 222).

At steps 238-242, a source, receiving the authentication message from the authentication platform 105, may grant or refuse access to resources requested by the user, based on the received authentication message. The source may grant access if the authentication message indicates that the user validation request is valid. The source may refuse access if the authentication message indicates that the user validation request is invalid.

At step 238, the user portal server 110 may grant or refuse access to content stored and/or an application operating on the user portal server 110. At step 240, the device 115-1 may grant or refuse access to the user to operate the device 115-1, or to enter a secure area for which access is controlled by the device 115-1, or to use an application operating on the device 115-1, or the like. At step 242, the network server 155 may grant or refuse access to the user to connect a device to the private network 150, or to use an application operating on the network server 155.

At step 244, the authentication platform 105 may deactivate token(s) stored in the authentication database 107-2. The authentication platform 105 may deactivate token(s), for example, after or in response to using the token(s) to determine that a user validation request is valid. The authentication platform 105 may deactivate token(s) stored in the authentication database 107-2 based on receiving token(s) (e.g., from the user token device 140) identical to the token(s) stored in the authentication database 107-2, and determining that user validation request is valid.

The authentication platform 105 may deactivate token(s) stored in the authentication database 107-2, for example, if the authentication platform 105 receives a command to deactivate the token(s) (e.g., from the administrator computing device 120). The command may indicate deactivation of all tokens in the user token device/online token repository or specific token(s) (e.g., token(s) specific to a particular assignee) in the user token device 140/online token repository. The administrator computing device 120 may transmit the command, for example, if the user is to be restricted from accessing all resources corresponding to the private network 150, or if the user is to be restricted from accessing resources corresponding to a specific assignee (e.g., a device, a system, an application, and/or the like).

At step 246, the user token device 140 may deactivate token(s), for example, stored in a memory associated with the user token device 140. The user token device 140 may deactivate token(s), for example, after or in response to using the token(s) to determine that a user validation request is valid. The user token device 140 may deactivate stored token(s) based on transmitting the token(s) (e.g., to the authentication platform 105) to request access to a resource, and/or the user corresponding to the user token device 140 being granted access to the requested resource. The user token device 140 may deactivate stored token(s) based on receiving a token deactivation message, from the authentication platform 105. The token deactivation message may indicate token(s), stored at the user token device, that are to be deactivated. The authentication platform 105 may transmit the token deactivation message after or in response to using the token(s) to determine that a user validation request is valid.

The user token device 140 may deactivate all token(s), or token(s) specific to a particular assignee, for example, if the user token device 140 receives a command to deactivate the token(s) (e.g., from the authentication platform 105 and/or the administrator computing device 120). The command may indicate deactivation of all tokens in the user token device 140 or specific token(s) (e.g., token(s) specific to a particular assignee) in the user token device 140. The authentication platform 105 and/or the administrator computing device 120 may transmit the command, for example, if the user is to be restricted from accessing all resources corresponding to the private network 150, or if the user is to be restricted from accessing resources corresponding to a specific assignee. The administrator computing device 120 may transmit a command to deactivate the token(s), for example, based on a determination that the token(s) have been compromised by an unauthorized entity. In an arrangement, the user token device 140 may automatically deactivate token(s) after transmitting the token(s) to the authentication platform.

Deactivation of tokens may comprise deletion of tokens at the authentication platform 105 and/or the user token device 140. Deactivation of tokens may comprise moving the tokens from a token chain to an audit store (e.g., at the authentication platform 105 and/or the user token device 140). The audit store may be used for troubleshooting and auditing purposes.

In an arrangement, a user may be assigned with a limited number of tokens for use in the private network 150. For example, the authentication platform 105 may only generate a limited number of tokens corresponding to a user. The authentication platform 105 may revoke access from the user after all assigned tokens have been used and deactivated. In an arrangement where an online token repository stores tokens corresponding to a user, the online token repository may deactivate tokens in a manner similar to as described above with reference to step 246.

The user token device 140 and/or the online token repository may store, in a personal token chain, token(s) corresponding to multiple private networks. The personal token chain may, for example, comprise token(s) corresponding to assignee(s) in the private network 150 and may further comprise token(s) corresponding to assignee(s) in the private network 170. The user token device 140 and/or the online token repository may operate, with respect to authentication and access to resources in the private network 170, in a manner that is similar to operations described with reference to FIGS. 2A-2D.

FIG. 3A shows an example token chain 300 corresponding to a particular user as stored in the authentication database 107-2, in accordance with one or more example embodiments. The token chain 300 may correspond to a user authorized to access resources in the private network 150. Generated tokens (e.g., as generated by the authentication platform 105) may be stored in the token chain 300 chronologically in the order in which the tokens are generated at the authentication platform 105. For example, token 302-3 may be generated after token 302-4, token 302-2 may be generated after token 302-3, and token 302-1 may be generated after token 302-2. Token 302-$n$ may be the oldest generated token in the token chain 300.

Each token 302 (e.g., tokens 302-1, 302-2, 302-3, 302-4 . . . , 302-$n$) may comprise a header (H) and a token body (Y). Token 302-1 may comprise a header H1 and a body Y1, token 302-2 may comprise a header H2 and a body Y2, etc. Header H may comprise an indication of an assignee (e.g., as determined at step 208) of the corresponding token 302. Assignees $A_1$, $B_1$, and $C_1$ may correspond to assignees in the private network 150. The tokens 302-1 and 302-3 may, for example, correspond to the assignee $A_1$, the token 302-2 may correspond to the assignee $B_1$, and the token 302-4 may correspond to the assignee $C_1$. Token body Y may comprise, for example, values generated based on user information using one or more of mathematical operations, encryption operations, encoding operations, and/or the like.

In an arrangement, a maximum number of tokens in the token chain 300 may be determined by an administrator, and/or may be fixed. The number of tokens may be determined, for example, based on a profile of the user (e.g., an employee designation of the user). In an arrangement, a maximum number of tokens corresponding to a particular assignee that may be stored in the token chain 300 may be dependent on a profile of a user, resources the user is authorized to access, and/or the like.

The generated tokens 302 may be transmitted to the user token device 140 by the authentication platform 105. FIG. 3B shows an example personal token chain 350 as stored in the user token device 140 corresponding to a user, in accordance with one or more example embodiments. The personal token chain 350 may comprise tokens corresponding to one or more different private networks (e.g., the private network 150 and/or the private network 170), and may be used to access resources in the one or more private networks. Tokens 302 may be used to access resources in the private network 150. The tokens 350 (e.g., tokens 350-1 and 350-2) may correspond to the private network 170, and may be used to access resources in the private network 170. The tokens 350-1 and 350-2 may correspond to an assignee $A_2$ and assignee $B_2$ in the private network 170, respectively.

Tokens (e.g., as received by the user token device 140) may be stored in the token chain 350 chronologically in the order in which the tokens are received. For example, the token 302-3 may be received after the token 302-4, token 350-2 may be received after the token 302-3, token 350-1 may be received after the token 350-2, token 302-2 may be received after token 350-1, and token 302-1 may be received after token 302-2. Token 302-$m$ may be the oldest token stored in the token chain 350.

The user token device 140 may receive a token request from the authentication platform 105. The token request may comprise an indication of a source and an indication of a number of tokens being requested. For example, the user token device 140 may receive a token request that requests token(s), corresponding to source $A_1$, from the user token device 140, and may further indicate that two tokens have been requested by the authentication platform. The user token device 140 may search the personal token chain 350 and locate the tokens 302-1 and 302-2 assigned to $A_1$. The user token device 140 may transmit the tokens 302-1 and 302-3 to the authentication platform 105. The authentication platform may compare tokens received from the user token device 140 with tokens stored in the authentication database 107-2 to authenticate the user.

Figure 4:
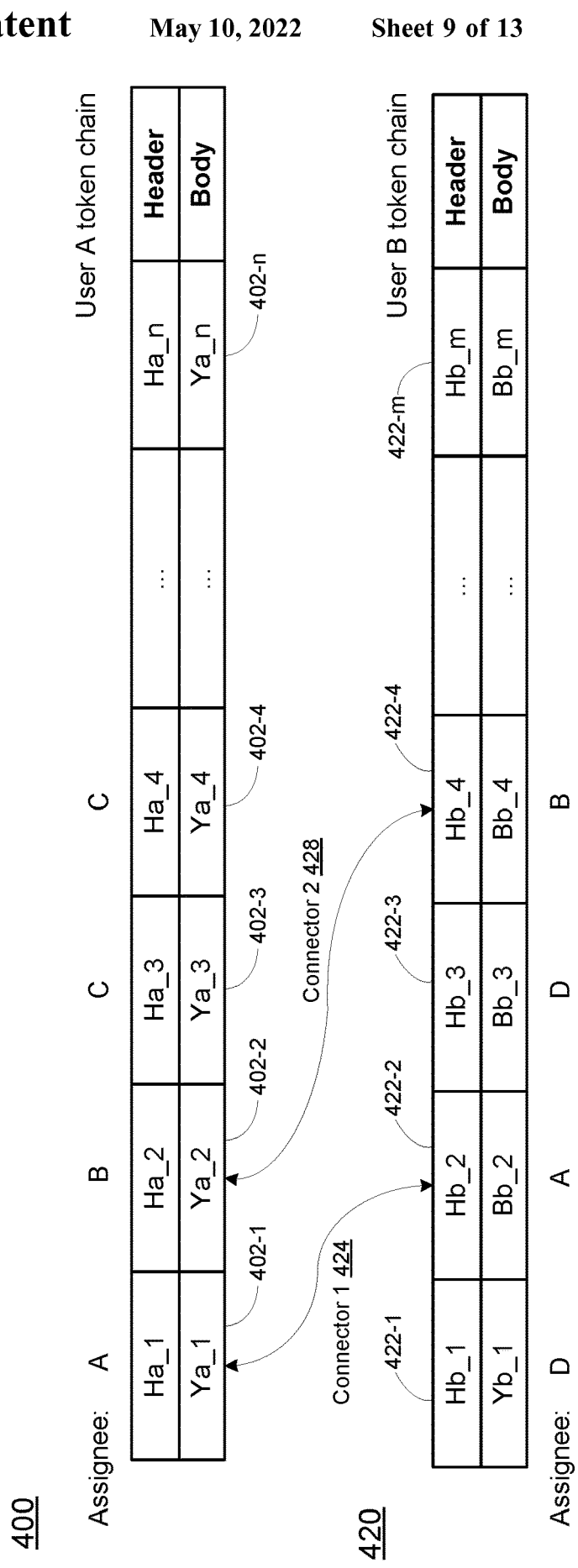
FIG. 4 shows an example token chain corresponding to a first user, and an example token chain corresponding to a second user, in accordance with one or more example embodiments.

In an arrangement, multiple users corresponding to a private network may be grouped in a user group. The multiple users may be, for example, share access to one or more resources in a private network (e.g., in a collaborative setting). In an arrangement, tokens corresponding to different users may be used to authenticate other users in the user group. FIG. 4 shows an example token chain 400 corresponding to a first user, and an example token chain 420 corresponding to a second user, in accordance with one or more example embodiments. The first user and the second user may be authorized to access resources in the private network 150. The token chains 400 and 420 may be stored in the authentication database 107-2.

Token chain 400 may comprise tokens 402 (e.g., tokens 402-1, 402-2, 402-3, 402-4 . . . , 402-$n$) and token chain 420 may comprise tokens 422 (e.g., tokens 422-1, 422-2, 422-3, 422-4 . . . , 422-$m$). Assignees A, B, C, and D may correspond to assignees in the private network 150. For the first user, the tokens 402-1 and 402-3 may correspond to the assignee A, the token 402-2 may correspond to the assignee B, and the token 402-4 may correspond to the assignee C. For the second user, the tokens 422-1 may, for example, correspond to an assignee D, the tokens 422-2 and 422-3 may correspond to the assignee A, and the token 422-4 may correspond to an assignee B.

In an arrangement, tokens from different token chains may be linked using token connectors, and may be used to authenticate users. The token 402-1 corresponding to user A may be linked to the token 422-2 using token connector 1 424. In an arrangement, the authentication platform 105 may generate the token 402-1 corresponding to the first user, link the generated token to another token 422-2 (corresponding to the same assignee A) in the token chain 420 corresponding to the second user, and transmit both tokens 402-1 and 422-2 to a user token device (e.g., the user token device 140) corresponding to the first user. Personal token chain corresponding to the first user, as stored in the user token device 140, may comprise tokens from the token chain 400, and may further comprise linked tokens from the token chain 420. The user token device 140 may transmit both tokens 402-1 and 422-2, for example, in response to receiving a token request, from the authentication platform 105, corresponding to a source identified as "A." A token connector 2 428 may link the token 402-2 corresponding to user A to the token 422-4, and may be used in a manner similar to the token connector 1 424.

In an arrangement, a token connector may be a pointer corresponding to a token that points to a location of another token in another token chain. The token 402-1 may comprise (e.g., in header Ha_1) a location of the token 422-2. Additionally, or alternatively, the token 422-2 may comprise (e.g., in the header Hb_2) a location of the token 402-1. In an arrangement, a token connector may be a single entry in a look-up table that references locations of the linked tokens 402-1 and 422-1. While FIG. 4 only illustrates tokens linked across two token chains, in other example, tokens may be linked across more than two token chains.

Figure 5:
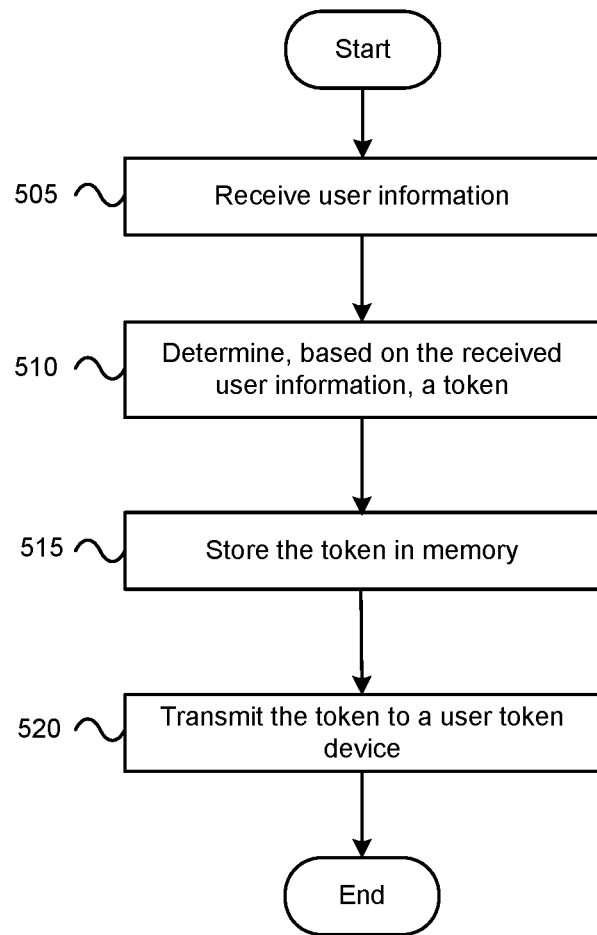
FIG. 5 shows an illustrative algorithm for generating and storing token(s) at an authentication platform, in accordance with one or more example embodiments.

FIG. 5 shows an illustrative algorithm for generating and storing token(s) at an authentication platform, in accordance with one or more example embodiments. At step 505, a computing platform comprising at least one processor, a communication interface, and memory may receive, via the communication interface, user information corresponding to a user. The user information may comprise biological and/or location information, corresponding to the user, determined using one or more sensor system(s) (e.g., the sensor system(s) 130).

At step 510, the computing platform may generate, based on the received user information, a token corresponding to the user. The computing platform may generate the token using one or more mathematical and/or encoding operations on the received user information. The computing platform may assign the token to a source (e.g., a device, a system, or an application).

At step 515, the computing platform may store the generated token into a memory associated with the computing platform. The computing platform, for example, may store the token in a token chain corresponding to the user. In an arrangement, storing the token in the memory may comprise linking the token to another token corresponding to another user.

At step 520, the computing platform may transmit the generated token to a user token device corresponding to the user. In an arrangement, the computing platform may further transmit another token, corresponding to another user, that is linked to the generated token. In various arrangements, the computing platform may correspond to the content delivery platform 105 described with reference to FIGS. 1A, 1B, 2A-2D, and/or FIGS. 3-4, or any other device that performs functions corresponding to FIG. 5.

Figure 6:
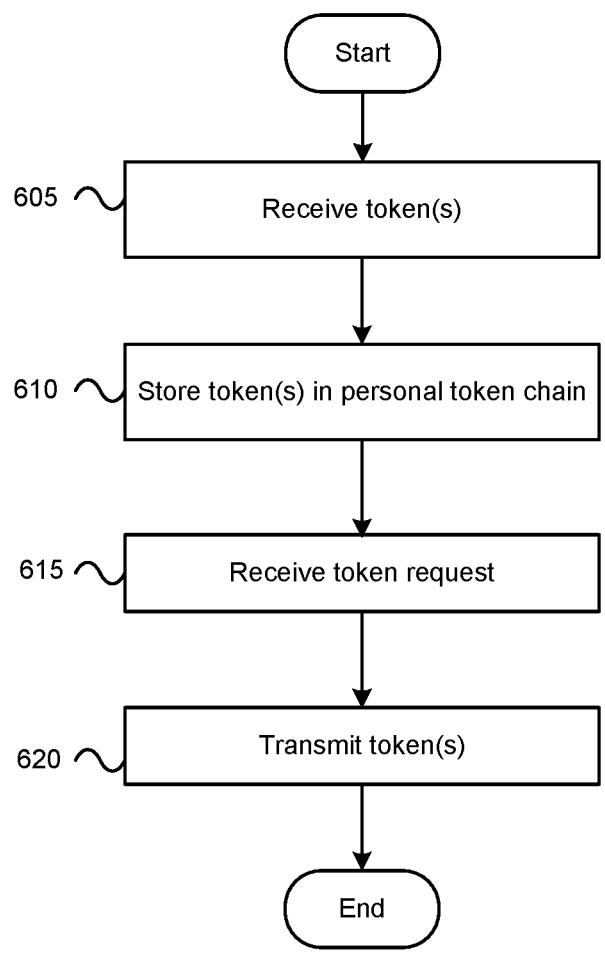
FIG. 6 shows an illustrative algorithm for receiving and storing token(s) at a user token device, in accordance with one or more example embodiments.

FIG. 6 shows an illustrative algorithm for receiving and storing token(s) at a user token device, in accordance with one or more example embodiments. At step 605, a user token device comprising at least one processor, a communication interface, and memory may receive, via a communication interface, one or more tokens. The one or more tokens may correspond to tokens that are generated at a computing platform based on user information corresponding to the user. The one or more tokens may further correspond to any linked tokens corresponding to another user. The one or more tokens may comprise respective indications of assignees corresponding to the tokens.

At step 610, the user token device may store the one or more tokens in a personal token chain corresponding to the user. The user token device may store the one or more tokens in the order in which the tokens is received.

At step 615, the user token device may receive, via a communication interface, a token request. The token request may comprise an indication of a source corresponding to the token request. The token request may further comprise an indication of a number of tokens requested.

At step 620, the user token device may transmit token(s) corresponding to the token request. Transmitting the token(s) may comprise retrieving token(s) that have been assigned to the source corresponding to the token request. Transmitting the token(s) may further comprise transmitting any linked tokens corresponding to another user.

Figure 7:
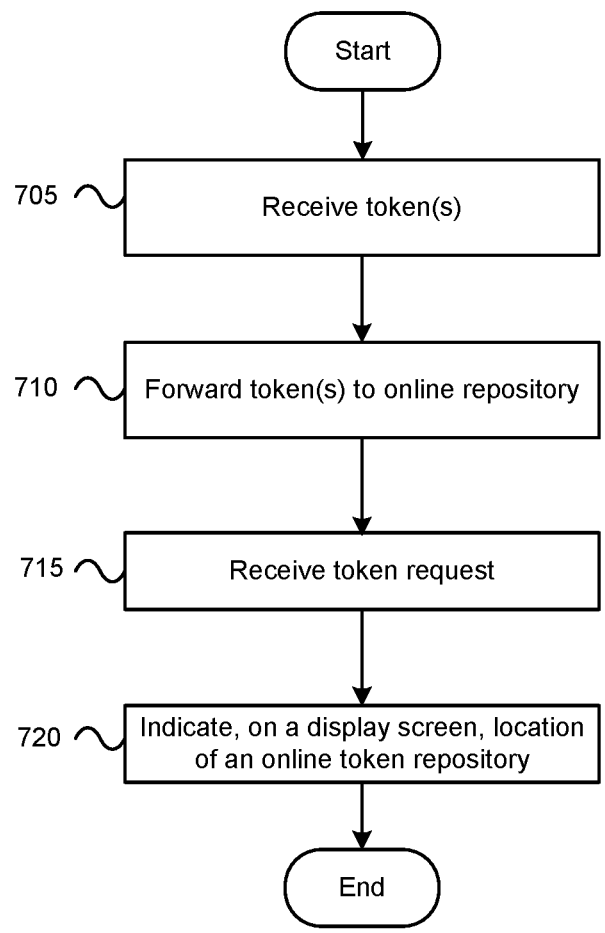
FIG. 7 shows an illustrative algorithm for receiving and forwarding token(s) to an online token repository, in accordance with one or more example embodiments.

FIG. 7 shows an illustrative algorithm for receiving and forwarding token(s) to an online token repository, in accordance with one or more example embodiments. At step 705, a user token device comprising at least one processor, a communication interface, and memory may receive, via a communication interface, one or more tokens. The one or more tokens may correspond to tokens that are generated at a computing platform based on user information corresponding to the user. The one or more tokens may further correspond to any linked tokens corresponding to another user. The one or more tokens may comprise respective indications of assignees corresponding to the tokens.

At step 710, the user token device 140 may receive the tokens and forward the token(s) to an online token repository for storage. At step 715, the user token device may receive, via a communication interface, a token request. The token request may comprise an indication of a source corresponding to the token request. The token request may further comprise an indication of a number of tokens requested.

At step 720, the user token device may display a code (e.g., a dynamic QR code) that may indicate a uniform resource locator (URL) corresponding to the online token repository. The user token device may display a code, for example, which may be scanned using a scanning device.

Figure 8:
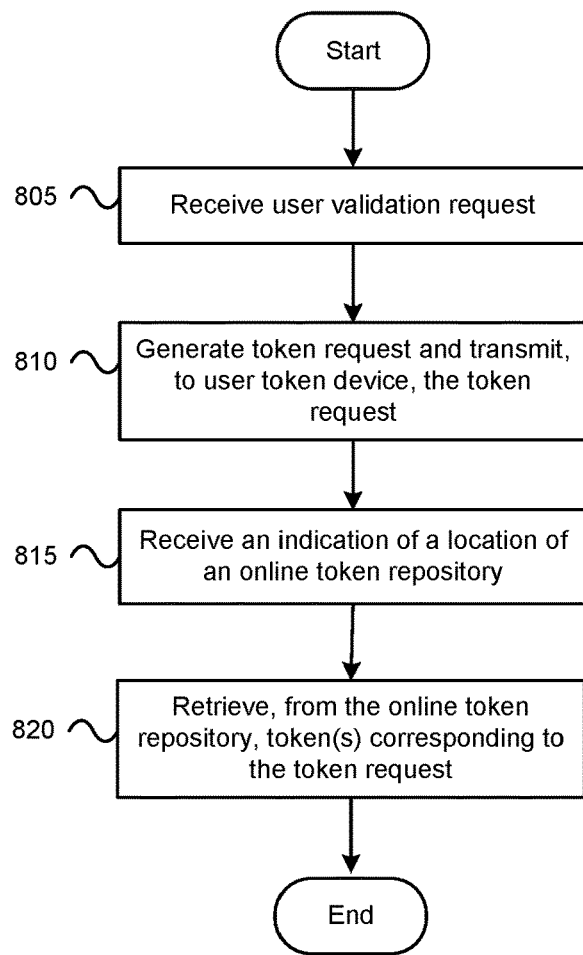
FIG. 8 shows an illustrative algorithm for generating, storing and transmitting token(s) at an authentication platform, and retrieving the tokens from an online token repository, in accordance with one or more example embodiments.

FIG. 8 shows an illustrative algorithm for generating, storing and transmitting token(s) at an authentication platform, and retrieving the tokens from an online token repository, in accordance with one or more example embodiments. At step 805, a computing platform comprising at least one processor, a communication interface, and memory may receive, via the communication interface, a user validation request. The user validation request may originate from a source (e.g., a device, a system, an application, and/or the like) and may comprise an indication (e.g., an identification code, MAC address, IP address, etc.) corresponding to the source.

At step 810, the computing platform may generate a token request to request token(s) from a user token device. The computing platform may generate the token request based on the received user validation request. The computing platform may transmit the token request to the user token device.

At step 815, the computing platform may receive an indication of a location of an online token repository. The indication may correspond a uniform resource locator (URL) corresponding to the online token repository. The indication may be received from a scanning device that scans a QR code displayed at the user token device.

At step 820, the computing platform may, based on the received indication, locate the online token repository, and retrieve token(s) from the personal token chain corresponding to the user from the online token repository. The computing platform may, for example, generate and transmit a token request to the online token repository, and receive the token(s), in response to the token request, from the token repository.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, user information corresponding to a user, wherein the user information comprises information determined using one or more sensor systems;
   generate, based on the user information, a first token corresponding to the user, wherein the first token comprises:
   a header comprising an indication of an assignee of the first token, wherein the assignee comprises one of a computing device, a system, or an application; and
   a body comprising a value generated based on the user information;
   store, in the memory, the first token, wherein the storing comprises storing the first token in a token chain corresponding to the user; and
   transmit, via the communication interface and to a user token device corresponding to the user, the first token.

2. The computing platform of claim 1, wherein the memory stores additional computer-readable instructions that, when executed by the at least one processor, cause the computing platform to:
   receive, via the communication interface and from a source, a user validation request, wherein the user validation request comprises an indication of the source;
   generate a token request, wherein the token request indicates that the user token device is to transmit one or more tokens assigned to the source; and
   transmit, via the communication interface and to the user token device, the token request.

3. The computing platform of claim 2, wherein the token request comprises an indication of a number of tokens requested from the user token device, wherein the memory stores additional computer-readable instructions that, when executed by the at least one processor, cause the computing platform to receive, from the user token device and based on the token request, a message, wherein the message indicates that the user token device does not have a number of tokens, assigned to the source, that is equal to the number of tokens requested from the user token device.

4. The computing platform of claim 3, wherein the memory stores additional computer-readable instructions that, when executed by the at least one processor, cause the computing platform to:
   generate, an authentication message, wherein the authentication message indicates that the user validation request is an invalid request, and
   transmit, to the source, the authentication message.

5. The computing platform of claim 3, wherein the memory stores additional computer-readable instructions that, when executed by the at least one processor, cause the computing platform to:
   generate, a new token request, wherein the new token request comprises an indication of one or more mathematical operations that may be used to generate new tokens;

transmit, to the user token device, the new token request; and receive, from the user token device and in response to the new token request, one or more second tokens, wherein the one or more second tokens comprise at least tokens generated based on the new token request.

6. The computing platform of claim 2, wherein the memory stores additional computer-readable instructions that, when executed by the at least one processor, cause the computing platform to:

receive, from the user token device and in response to the token request, one or more second tokens, wherein the one or more second tokens are assigned to the source;

compare the one or more second tokens with one or more third tokens in the token chain;

based on the comparison, determine whether the one or more second tokens correspond to the one or more third tokens;

generate, an authentication message, wherein the authentication message indicates:

when the one or more second tokens correspond to the one or more third tokens, that the user validation request is a valid request, and when the one or more second tokens do not correspond to the one or more third tokens, that the user validation request is an invalid request; and transmit, to the source, the authentication message.

7. The computing platform of claim 6, wherein the token request comprises an indication of a number of the one or more second tokens.

8. The computing platform of claim 6, wherein the memory stores additional computer-readable instructions that, when executed by the at least one processor, cause the computing platform to:

when the one or more second tokens correspond to the one or more third tokens, deactivate the one or more third tokens, generate a token deactivation message, wherein the token deactivation message indicates the one or more second tokens; and transmit, via the communication interface and to the user token device, the token deactivation message.

9. The computing platform of claim 1, wherein storing the first token comprises storing only a first portion of the first token, and transmitting the first token comprises transmitting only a second portion of the first token, and wherein the memory stores additional computer-readable instructions that, when executed by the at least one processor, cause the computing platform to:

generate, based on the first portion of the first token and the second portion of the first token, a checksum; and store, in the memory, the checksum, wherein storing the checksum comprises associating the checksum with the first portion of the first token.

10. The computing platform of claim 1, wherein the memory stores additional computer-readable instructions that, when executed by the at least one processor, cause the computing platform to:

receive a request to deactivate one or more second tokens stored in the memory; and based on the request, deactivate the one or more second tokens.

11. The computing platform of claim 1, wherein the user information comprises at least one of user biological information, user location information, or information corresponding to user activity in a network associated with the computing platform.

12. A method, at a computing platform comprising at least one processor, a communication interface, and memory, the method comprising:

receiving, via the communication interface, user information corresponding to a user, wherein the user information corresponds to information determined using one or more sensor systems;

generating, based on the user information, a first token corresponding to the user, wherein the first token comprises:

a header comprising an indication of an assignee of the first token, wherein the assignee comprises one of a computing device, a system, or an application; and a body comprising a value generated based on the user information;

storing, in the memory, the first token, wherein the storing comprises storing the first token in a token chain corresponding to the user; and transmitting, via the communication interface and to a user token device corresponding to the user, the first token.

13. The method of claim 12, further comprising:

receiving, via the communication interface and from a source, a user validation request, wherein the user validation request comprises an indication of the source;

generating a token request, wherein the token request indicates that the user token device is to transmit one or more tokens assigned to the source; and transmitting, via the communication interface to the user token device, the token request.

14. The method of claim 13, wherein the token request comprises an indication of a number of tokens requested from the user token device, wherein the method further comprises receiving, from the user token device and based on the token request, a message, wherein the message indicates that the user token device does not have a number of tokens, assigned to the source, that is equal to the number of tokens requested from the user token device.

15. The method of claim 14, the method further comprising:

generating, an authentication message, wherein the authentication message indicates that the user validation request is an invalid request, and transmitting, to the source, the authentication message.

16. The method of claim 14, further comprising:

generating, a new token request, wherein the new token request comprises an indication of one or more mathematical operations that may be used to generate new tokens;

transmitting, to the user token device, the new token request; and receiving, from the user token device and in response to the new token request, one or more second tokens, wherein the one or more second tokens comprise at least tokens generated based on the new token request.

17. The method of claim 13, further comprising receiving, from the user token device and in response to the token request, one or more second tokens, wherein the one or more second tokens are assigned to the source;

comparing the one or more second tokens with one or more third tokens in the token chain;

based on the comparison, determining whether the one or more second tokens correspond to the one or more third tokens;

generating, an authentication message, wherein the authentication message indicates:
- when the one or more second tokens correspond to the one or more third tokens, that the user validation request is a valid request, and
- when the one or more second tokens do not correspond to the one or more third tokens, that the user validation request is an invalid request; and transmitting, to the source, the authentication message.

18. One or more non-transitory computer-readable media storing instructions that, when executed by a computing platform comprising at least one processor, a communication interface, and memory, cause the computing platform to:
- receive, via the communication interface, user information corresponding to a user, wherein the user information corresponds to information determined using one or more sensor systems;
- generate, based on the user information, a token corresponding to the user, wherein the token comprises:
  - a header comprising an indication of an assignee of the token, wherein the assignee comprises one of a computing device, a system, or an application; and
  - a body comprising a value generated based on the user information;
- store, in the memory, the token, wherein the storing comprising storing the token in a token chain corresponding to the user; and
- transmit, via the communication interface and to a user token device, the token.

* * * * *